United States Patent
Chilton (12)

(10) Patent No.: US 6,732,117 B1
(45) Date of Patent: May 4, 2004

(54) TECHNIQUES FOR HANDLING CLIENT-ORIENTED REQUESTS WITHIN A DATA STORAGE SYSTEM

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 373 days.

(21) Appl. No.: 09/794,862

(22) Filed: Feb. 27, 2001

(51) Int. Cl.[7] ............................................. G06F 17/30

(52) U.S. Cl. ...................... 707/103 X; 707/10; 709/223; 709/227

(58) Field of Search ............................... 707/1–3, 9–10, 707/100–104.1; 709/227, 223

(56) References Cited

U.S. PATENT DOCUMENTS

| | | | | |
|---|---|---|---|---|
| 5,649,185 A | * | 7/1997 | Antognini et al. ............. | 707/9 |
| 6,044,367 A | * | 3/2000 | Wolff ............................. | 707/2 |
| 2002/0095400 A1 | * | 7/2002 | Johson et al. .................. | 707/1 |

OTHER PUBLICATIONS

Keller et al., "A predicate–based caching schema for client–server database architectures", Sep. 28–30, 1994, Dept of computer Science, Stanford Univ., pp. 229–238.*

* cited by examiner

Primary Examiner—John Breene
Assistant Examiner—Mohammad Ali
(74) Attorney, Agent, or Firm—Chapin & Huang, L.L.C.; David E. Huang, Esq.

(57) ABSTRACT

The invention is directed to techniques for handling a client-oriented request within a data-storage system. Handling of a client-oriented request enables direct communication between a client and the system thus offloading any servers' burden of handling client requests. Furthermore, in some situations, such handling of the client-oriented request within the data storage system enables reduced traffic through the cache of the system, and reduced traffic between the system and external devices. In one arrangement, the data storage system includes a set of ports for connecting to an external host, a cache for buffering data exchanged between the external host and a set of storage devices, and a set of interface circuits including front-end interface circuits interconnected between the cache and the set of ports, and back-end interface circuits interconnected between the cache and the set of storage devices. The interface circuits are configured to receive a client-oriented request from the external host and perform a server-oriented operation in response to the client-oriented request.

25 Claims, 14 Drawing Sheets

TECHNIQUES FOR HANDLING CLIENT-ORIENTED REQUESTS WITHIN A DATA STORAGE SYSTEM

BACKGROUND OF THE INVENTION

A typical data storage system operates as a large storage device for one or more external host computers (or simply hosts) by responding to block-based input/output (I/O) requests that direct the data storage system to perform load and store operations. Examples of block-based communications include small computer systems interface (SCSI) commands, Enterprise System Connection (ESCON) signals, Fibre Channel communications, and the like.

In some client/server configurations, hosts operate as servers that provide services (e.g., client-oriented access to a data storage system) to one or more other computers called clients. In contrast to block-based communications which servers and data storage systems use to communicate with each other, clients and servers typically communicate with each other using client-oriented and server-oriented communications (hereinafter, generally referred to as client-oriented communications). Examples of client-oriented communications include Transmission Control Protocol/Internet Protocol (TCP/IP) communications, Gigabit Ethernet signals, Asynchronous Transfer Mode (ATM) communications, and the like.

In one configuration, a client can retrieve data from a data storage system by sending a client-oriented request (e.g., a TCP/IP signal) to a server (i.e., a host). The server then provides a block-based request (e.g., a SCSI signal) for data blocks containing the data to the data storage system. Next, the data storage system provides the requested data blocks (e.g., a SCSI signal) to the server in response to the block-based request. The server then extracts the data from the data blocks, and provides that data to the client (e.g., via a TCP/IP signal). Further details of this configuration will now be provided with reference to FIG. 1.

FIG. 1 shows a conventional data storage network 20 having a client/server configuration which utilizes a data storage system. The data storage network 20 includes a client system 22, a server system 24, and a conventional data storage system 26. The client system 22 runs an application front-end 28, such as a graphical user interface (GUI), that enables a user to communicate with the server system 24. The server system 24 runs an application back-end 30 and a storage manager 32. The application back-end 30 includes a client services module 34 for handling requests from clients, and a back-end processing module 36 for performing back-end processing operations.

As further shown in FIG. 1, the data storage system 26 includes front-end circuitry 38, a cache 40, back-end circuitry 42, and disk drives 44-1, . . . , 44-N (collectively, disk drives 44). The cache 40 operates as a buffer for data exchanged between the server system 24 (an external host system) and the disk drives 44. Additionally, the front-end circuitry 38 operates as an interface between the server system 24 and the cache 40. Similarly, the back-end circuitry 42 operates as an interface between the cache 40 and the disk drives 44.

In some data storage systems, the front-end circuitry 38 includes multiple front-end circuits and the back-end circuitry 42 includes multiple back-end circuits for redundancy (i.e., fault tolerance) and load balancing purposes. An example of such a data storage system is the Symmetrix which is manufactured by EMC Corporation of Hopkinton, Mass.

For illustration purposes, suppose that the data storage network 20 operates as a flight reservation system. That is, suppose that a user can operate the client system 22 to (i) find empty seats on particular flights of an airline, and (ii) purchase tickets to reserve such seats. To this end, the disk drives 44 of the data storage system 26 store a database containing records of all seats for all flights of the airline. The storage manager 32 of the server system 24 operates as a database engine that manages the database, and performs database queries on the database (i.e., performs search and filter operations on the database to find particular records) on behalf of the application back-end 30 running on the server system 24. The client services module 34, which provides client services to the application front-end 28 running on the client system 22 (e.g., finds empty seats on particular flights), is capable of submitting such queries to the storage manager 32 (i.e., database engine). Similarly, the back-end processing module 36, which performs back-end processing on the server system 24 (e.g., allocates and schedules airline resources and inventories, prints tickets for newly reserved seats on a nightly basis, etc.), is also capable of submitting queries to the storage manager 32. In response to the queries from the client services module 34 and the back-end processing module 36, the storage manager 32 communicates with the data storage system 26 using block-based communications (e.g., SCSI signals). An example of such a storage manager is Oracle Database Server which is manufactured by Oracle Corporation of Redwood Shores, Calif. An example of how a user operates the flight reservation system 20 will now be provided.

Suppose that the user wishes to reserve an empty seat on a particular flight. The user enters a request for empty seats on the particular flight using the application front-end 28 running on the client system 22. In response, the client system 22 sends a client-oriented request 46 (e.g., a TCP/IP signal) to the server system 24. The client-oriented request 46 requests all empty seats on the particular flight. In response to the client-oriented request 46, the client service module 34 of the application back-end 36 directs the storage manager 32 (i.e., the database engine) to perform a database query on the database stored in the disk drives 44. In particular, the application server module 34 specifies the particular flight, and indicates that it wants all empty seats on that particular flight. In turn, the storage manager 32 sends a block-based request 48 (e.g., SCSI commands) for the entire database (i.e., all seats for all flights of the airline) to the data storage system 26.

When the data storage system 26 receives the block-based request 48 from the storage manager 32 of the server system 24, the data storage system 26 provides a block-based response 50 (e.g., a SCSI signal) containing the entire database. In particular, if the database is un-cached, the back-end 42 copies the database from the disk drives 44 to the cache 40. Then, the front-end 38 transfers the copied database from the cache 30 to the storage manager 32. If copies of any portions of the database resided within the cache, the front-end 38 can transfer those cached copies from the cache to the storage manager 32 without having to load new copies of those portions from the disk drives 44.

When the storage manager 32 receives the database, the storage manager 32 queries the database to obtain all empty seats on the particular flight. In particular, the storage manager 32 searches the database records which contain all seats for all flights of the airline to determine which seats are for that particular flight, and which of those seats are empty. In some configurations, the transfer of the copied database from the disk drives 44 to the server system 24, and the database query operations, occur incrementally and concurrently to improve response time. The storage manager 32 then provides the query results to the client services module 34 which conveys this information in the form of a server-oriented response 52 (e.g., a TCP/IP signal) to the application front-end 28 running on the client system 22. Once the user knows which seats on the particular flight are empty, the user can reserve one of the empty seats on the particular flight by further communicating with the server system 24 which accesses the database again in a similar manner to that described above.

In some configurations, the server system 24 can use hash tables to improve response times to client-oriented requests. For example, in the above-described flight reservation system, the server system 24 can generate a hash table that identifies all empty seats of all flights, and store that hash table on the data storage system 26. In particular, the back-end processing module 36 of the server system 24 can (i) direct the storage manager 32 to read the entire database from the data storage system 26, (ii) generate a hash table that references all of the empty seats on all of the flights by querying the database, and (iii) store the generated hash table on the data storage system 26. The back-end processing module 36 can do this when server system 24 is less busy (e.g., late at night or early in the morning). When a user at the client system 22 later submits the client-oriented request 46 for all empty seats on a particular flight, the server system 24 can retrieve the hash table (rather than the entire database) from the data storage system 26 and identify the empty seats on the particular flight by searching the hash table. Since the hash table is generally much smaller than the database itself, the server system 24 requires less time to respond to the client-oriented request 46 (i.e., to retrieve and search the hash table) thus providing less network traffic and a response time that is superior to the configuration that requires reading the entire database from the data storage system 26 and searching that database.

SUMMARY OF THE INVENTION

Unfortunately, there are deficiencies to the earlier-described conventional data storage network of FIG. 1. First, there typically is a large amount of traffic that passes through the cache 40 of the data storage system 26. For example, in the earlier-described flight reservation scenario, the entire database (e.g., the whole seating plan for all of the airline flights) typically is copied from the disk drives 44 into the cache 40 in response to the block-based request 48 (e.g., a SCSI command), and then transferred from the cache 40 to the server system 24. Such an operation typically results in heavy cache usage that produces congestion within the cache 40 which interferes with other unrelated load and store operations, i.e., creates contention situations requiring coordinated use of the cache 40 in order to handle the other data transfers. Additionally, such an operation typically results in a high retrieval latency, particularly when the size of the database is very large, since larger databases require more time to load from the disk drives 44 and pass through cache 40. Furthermore, such an operation places a heavy incentive on increasing the size of the cache 40 to alleviate the cache utilization issues thus increasing the cost of the cache 40 (i.e., memory costs). Even if the size of the cache 40 is increased in order to decrease cache contention, the opportunity to improve performance by re-using cached data at the data storage system 26 (i.e, data stored in the cache 40) could be minimal since the server system 24 will likely cache the data there as well.

Another deficiency of the conventional data storage network 20 of FIG. 1 is that there typically is a large amount of traffic between the server system 24 and the data storage system 26. In the flight reservation example, the entire database containing seat information for all seats on all flights of the airline is transferred from the data storage system 26 to the server system 24 (e.g., SCSI signals) in response to a single user request for empty seats on a particular flight. Such a transfer results in poor retrieval latency as well as consumes bandwidth between the data storage system 26 and the server system 24 that could otherwise be used for other communications (e.g., bandwidth that the server system 24 or other hosts could use to access other data within the data storage system 26).

A further deficiency of the conventional data storage network 20 of FIG. 1 is that the server system 24 is burdened with having to provide all data access services to all clients (e.g., operations of the client services module 34) as well as traditional back-end processing (e.g., standard operations of the back-end processing module 36). For example, in the earlier-described flight reservation scenario, the storage manager 32 performs database queries for clients (e.g., the client system 22) thus consuming processing cycles that otherwise could be spent elsewhere, e.g., on traditional back-end processing operations. Moreover, the storage manager 32 of the server system 24 is often a bottleneck to clients accessing the data storage system 26.

There are deficiencies with the above-described hash table configuration as well. In particular, the server system 24 is now required to periodically retrieve the entire database from the data storage system 26 in order to generate the hash table. The server system 24 then needs to implement a mechanism to keep the hash table updated and synchronized with the database. Such a mechanism can be extremely complex if multiple servers need to coordinate contention for the hash table as well as for the database itself.

Another deficiency is that some configurations may include multiple server systems 24 for load balancing and/or fault tolerance. In such configurations, the server systems 24 typically coordinate access to the database by communicating with each other through a network, i.e., through "multiple server intercommunication". For example, when one server system 24 updates a record, that server notifies the other server systems 24 through the network that it has reserved that record, updates the record and then notifies the other server systems 24 through the network that it has unreserved that record. Accordingly, server systems 24 can create excessive network traffic coordinating access to the database.

In contrast to the earlier-described conventional data storage network 20 of FIG. 1 which has a server system 24 receiving a single client-oriented request (e.g., a TCP/IP request) and submitting a block-based request 48 (e.g., a SCSI command) to the data storage system 26 for an entire database (or hash table) in response to the client-oriented request, the invention is directed to techniques for handling a client-oriented request within a data storage system. Handling of a client-oriented request enables direct communication between clients and the data storage system thus offloading the burden of handling certain client requests from the server. Furthermore, in some situations, such handling of the client-oriented request within the data storage system enables reduced traffic through the cache of the data storage system, and reduced traffic between the data storage system and external devices e.g., results of database queries can be transferred rather than entire databases. For example, if database queries are performed within the data storage system itself, database transfers and extensive multiple server intercommunication through a network can be avoided (e.g., extensive reserve/unreserve notifications between servers becomes unnecessary) since servers no longer need to coordinate database accesses on behalf of clients.

One arrangement of the invention is directed to a data storage system having a set of ports for connecting to an external host (e.g. a server), a cache for buffering data exchanged between the external host and a set of storage devices, and a set of interface circuits including (i) multiple front-end interface circuits interconnected between the cache and the set of ports, and (ii) multiple back-end interface circuits interconnected between the cache and the set of storage devices. The set of interface circuits is configured to receive a client-oriented request (e.g., a Gigabit Ethernet signal) from the external host and perform a server-oriented operation in response to the client-oriented request. By way of example, the external host can be a client, and the server-oriented operation can be a database query (e.g., filter/sort based on field1="X", field2="Y") performed (within the data storage system) on a database on behalf of the client. Accordingly, a server system does not need to perform the database query as in the conventional data storage network 20 of FIG. 1, and there is no need to transfer the entire database from the data storage system to such a server system. Since the burden of handling such a client-oriented request is not placed on the server system (if one exists), the server system has more capacity to perform other operations such as additional back-end processing operations.

In some arrangements, the client-oriented request identifies a database and a database query operation, and the multiple front-end interface circuits are configured to perform the database query operation on any cached portions of the database residing in the cache in response to the client-oriented request. In these arrangements, the multiple back-end interface circuits are configured to perform the database query operation on un-cached portions of the database residing in the set of storage devices in response to the client-oriented request. Accordingly, the entire database does not need to pass through the cache in response to the client-oriented request. Rather, the interface circuits can perform the database query such that, in response to the client-oriented request, only the results of the query pass through the cache and eventually to the external host.

In one arrangement, the un-cached portions of the database are stored in the set of storage devices in a distributed manner. Here, each of the multiple back-end interface circuits is configured to perform, in response to the client-oriented request, the database query operation on a respective un-cached portion of the database stored in a storage device to which that back-end interface circuit connects. Accordingly, each back-end interface circuit does not need to query the entire database. Rather, each back-end interface circuit can simply query a respective un-cached portion of the database if such a portion exists. The back-end interface circuit can then cache the results of the query (e.g., individual records).

In other arrangements, the client-oriented request identifies a web address. In these arrangements, the multiple front-end interface circuits are configured to provide, from the cache, cached portions of web content corresponding to the web address identified by the client-oriented request in response to the client-oriented request. Additionally, the multiple back-end interface circuits are configured to retrieve, from the set of storage devices, un-cached portions of web content corresponding to the web address identified by the client-oriented request in response to the client-oriented request. That is, the back-end interface circuits can cache the un-cached portions of the identified web content. Accordingly, the data storage system essentially can operate as a web server that services web clients (external hosts) without any need for a dedicated external host to operate as a server system.

In some arrangements, the un-cached portions of web content identify an additional web address. In these arrangements, the multiple back-end interface circuits are further configured to (i) detect the additional web address in the web content while the multiple back-end interface circuits retrieve the un-cache portions from the set of storage devices, and (ii) cache, from the set of storage devices, web content corresponding to the additional web address in response to detection of the additional web address. Accordingly, the data storage system can pre-fetch web content (e.g., another web page, a banner, an image, etc.) that is likely to be requested by a subsequent request to reduce data retrieval latency.

In some arrangements, the client-oriented request identifies a file name and a directory name, and the multiple front-end interface circuits are configured to provide, from the cache, cached portions of a file corresponding to the file name and the directory name identified by the client-oriented request in response to the client-oriented request. In these arrangements, the multiple back-end interface circuits are configured to provide, from the set of storage devices, un-cached portions of the file corresponding to the file name and the directory name identified by the client-oriented request in response to the client-oriented request. Accordingly, the data storage system can essentially operate as a file server that services clients, e.g., a network file system (NFS) server that services NFS clients, without any need for a dedicated external host to operate as a server system.

In other arrangements, the set of storage devices store, in a single directory corresponding to the directory name identified by the client-oriented request, both (i) the file corresponding to the file name and the directory name identified by the client-oriented request and (ii) another file. In these arrangements, the multiple back-end interface circuits are further configured to (i) detect existence of the other file while the multiple back-end interface circuits retrieve the un-cache portions from the set of storage devices, and (ii) cache, from the set of storage devices, the other file in response to detection of the existence of the other file. As such, the data storage system can pre-fetch files in the same directory that are likely to be requested by a subsequent request to reduce data retrieval latency.

In one arrangement, the data storage system further includes a set of network adaptors for sending client-oriented communications to the external host and receiving client-oriented communications from the external host. Here, the set of network adaptors is interconnected between the multiple front-end interface circuits and the set of ports. The set of network adaptors enable external hosts to communicate with the data storage system without using block-based communications (e.g., SCSI commands, ESCON communications, etc.). Even servers, which are configured to access the data storage system in a client-like manner using client-oriented requests, can access the data storage system without using block-based communications.

The features of the invention, as described above, may be employed in data storage networks, systems, devices and methods and other computer-related components such as those manufactured by EMC Corporation of Hopkinton, Massachusetts.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for handling a client-oriented request (e.g., a Gigabit Ethernet signal containing a client request) within a data storage system. Handling of the client-oriented request enables direct communication between a client and the data storage system thus offloading the burden of handling the client request from any server system. Additionally, in some situations, such handling of the client-oriented request within the data storage system enables reduced traffic through the cache of the data storage system, and reduced traffic between the data storage system and external devices, e.g., client systems and server systems which communicate with the data storage system.

Figure 2:
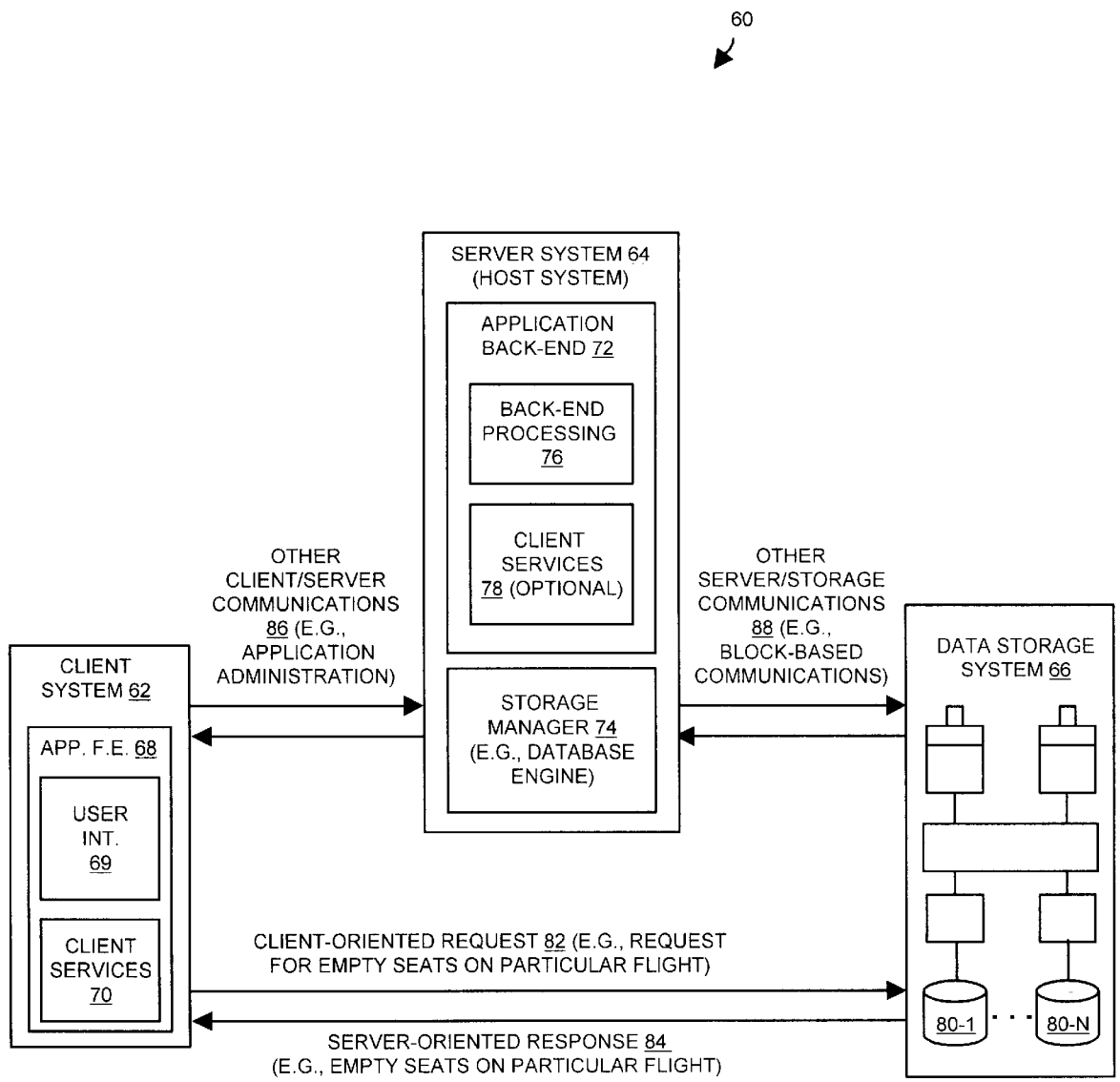
FIG. 2 is a block diagram of a configuration, which includes a client system, a server system and a data storage system, that is suitable for use by the invention.

FIG. 2 shows a data storage network 60 which is suitable for use by the invention. The data storage network 60 includes a client system 62, a server system 64, and a data storage system 66. The client system 62 includes an application front-end 68 which has a user interface 69 (e.g., a GUI) and a client services modules 70. The server system 64 includes an application back-end 72 and, optionally, a storage manager 74. The application back-end 72 includes and a back-end processing module 76 for performing back-end processing operations, and optionally a client services module 78 for handling client requests. The data storage system 66 includes, among other things, a set of storage devices 80-1, . . . 80-N (collectively, storage devices 80).

The data storage system 66 is configured to perform operations beyond those performed by a conventional data storage system. In particular, the data storage system 66 is capable of receiving client-oriented requests (e.g. client requests defined by TCP/IP signals, Gigabit Ethernet signals, ATM signals, etc.) and performing server-oriented operations in response to such client-oriented requests. The data storage system 66 is further capable of responding to block-based communications from external devices (e.g., the server system 64). Further details of the data storage system 66 will be provided by way of example.

Suppose that the data storage network 60 is configured to operate as a flight reservation system. That is, suppose that a user can operate the client system 62 to find empty seats on particular flights in airline, and purchase tickets are reserved such seats. To this end, the storage devices 80 (e.g., disk drives) of the data storage system 66 store a database containing records of all seats of all flights of the airline. The storage manager 74 of the server system 64 can operate as a database engine for accessing the database (e.g. performing database queries on the database) on behalf of the application back-end 72 running on the server system 64. Additionally, circuitry within the data storage system 66 is configured to operate as a database engine for accessing the database on behalf of the application front-end 68 of the client system 62 (and perhaps other clients as well). An example of how a user operates the flight reservation system will now be provided.

Suppose that a user wishes to reserve an empty seat on a particular flight. The user enters a request for empty seats on the particular flight using the user interface 69 of the application front-end 68 running on the client system 62. In response, the client services module 70 of the client system 62 sends a client-oriented request 82 (e.g., a Gigabit Ethernet signal containing a client request) to the data storage system 66. The client-oriented request 82 requests all empty seats on the particular flight. The data storage system 66 receives the client-oriented request 82 and performs a database query (a server-oriented operation) on the database stored in the storage devices 80. In particular, circuitry within a data storage system 68 searches the database records of the database stored in the storage devices 80 to determine (i) which seats are for that particular flight, and (ii) which of those seats are empty. The data storage system 66 then provides the results of this database query to the application front-end 66 running on the client system 62 in the form of a server-oriented response 84 (e.g., a Gigabit Ethernet signal). In particular, the data storage system 66 provides, as the query results, only the empty seats on the particular flight. Since the user is able to determine all the empty seats on the particular flight without communicating with the server system 64, there is less burden placed on the server systems 64. Accordingly, the server systems 64 has more capacity for performing other operations (e.g. additional back-end processing operations) compared to conventional server systems which handle database queries on behalf of clients.

It should be understood that the server systems 64 is also capable of handling client-oriented requests in a traditional client/server manner. In particular, the client system 62 can send the server system 64 client/server communications 86 such as administrative commands for controlling back-end processing performed by the application back-end 72 (e.g., allocating and scheduling airline resources, nightly printing of tickets for newly reserved seats, etc.).

It should be further understood that the server systems 64 is also capable of communicating with the data storage system 66. For example, the back-end processing module 76 of the application back-end 72 is capable of submitting client-oriented requests to the data storage system 66 in the same manner as the client system 62 in order to have the data storage system 66 handle the client-oriented requests by performing server-oriented responses.

Nevertheless, the server system 64 optionally can be equipped to communicate with the data storage system 66 using block-based communications in a traditional manner as well. For example, the back-end processing module 76 can submit database queries to the optional storage manager 74 (e.g., a database engine), and the optional storage manager 74 can respond to the database queries by sending block-based communications to the data storage system 66 in order to obtain data from the data storage system 66. Additionally, a client can submit a client-oriented request to the optional client services module 78 of the application back-end 72, and the optional client services module 78 can respond by accessing the data storage system 66 through the storage manager 74. Further details of the data storage system 66 will now be provided with reference to FIG. 3.

Figure 3:
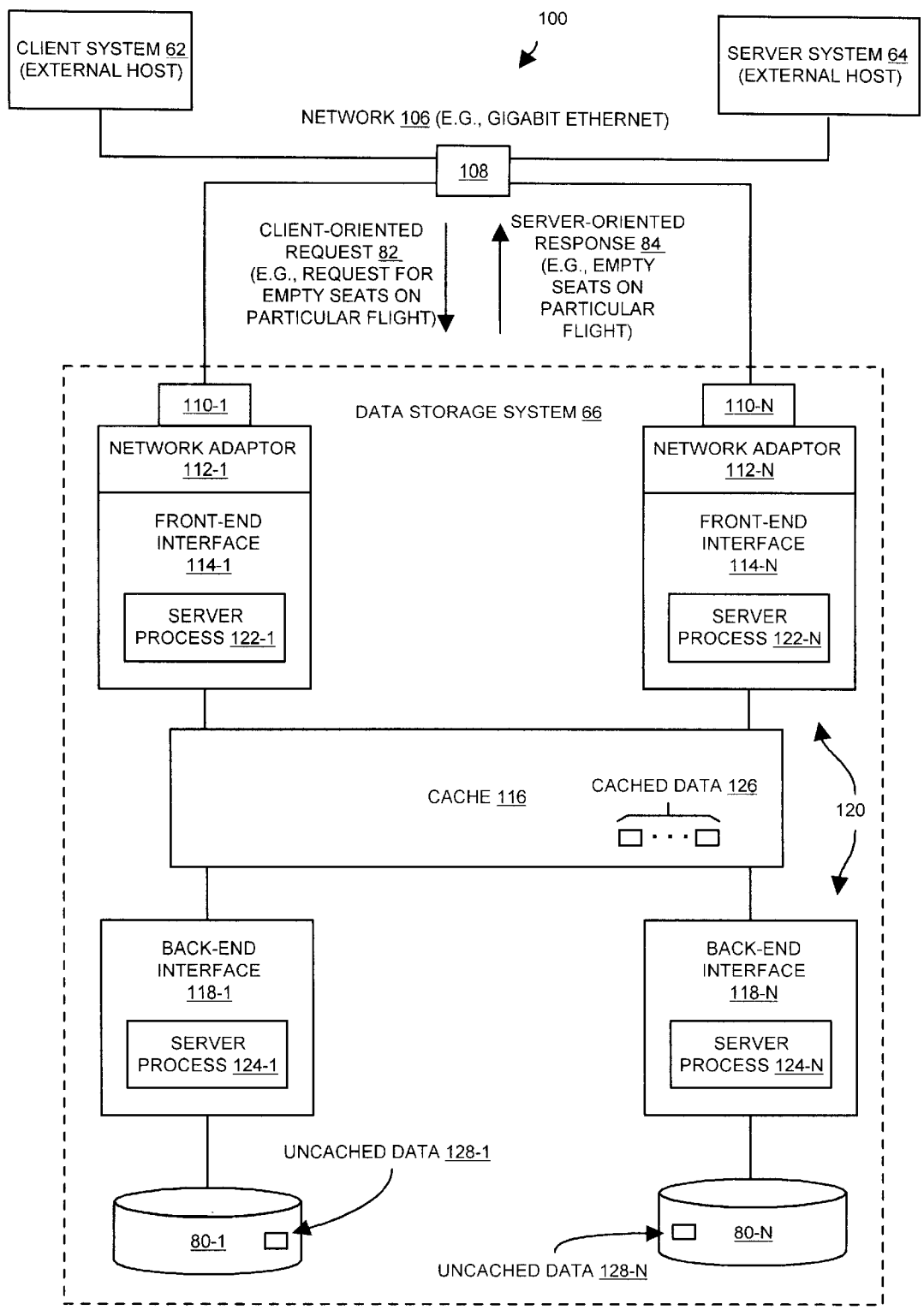
FIG. 3 is a block diagram of a data storage system which is suitable for use in the configuration of FIG. 2.

FIG. 3 shows and more detailed implementation 100 of the data storage system 60 of FIG. 2. In the implementation 100, a network 108 connects the client system 62 (an external host), the server systems 64 (another external host), and the data storage system 66 together. By way of example only, the network 106 has a star topology for carrying client-oriented communications (e.g., Gigagbit Ethernet signals). Accordingly, the network 106 includes a data communications device 108 (e.g., a hub, switch, etc.) through which the client-oriented communications pass.

As shown in FIG. 3, the data storage system 66 includes the earlier-described storage devices 80, a set of ports 110, network adaptors 112, front-end interface circuits 114, the cache 116, and back-end interface circuits 118. The front-end interface circuits 114 and the back-end interface circuits 118 form a set of interface circuits 120 which are capable of performing server-oriented operations. To this end, at least one of the interface circuits 120 runs a server process 122, 124 for performing server-oriented operations. In one arrangement, each of the interface circuits 120 runs such a server process 122, 124.

It should be understood that the cache 116 operates as a buffer for data exchanged between external hosts (e.g., the client system 62 and the server systems 64) and the storage devices 80. The front-end interface circuits 114 operate as interfaces between the external hosts and the cache 116. Similarly, the back-end interface circuits 118 operate as interfaces between the cache 116 and the storage devices 80. The network adapters 112, which are interconnected between the set of ports 110 and multiple front-end interface circuits 114, enable the front-end interface circuits 114 to receive and handle client-oriented requests from the network 106.

It should be further understood that the cache 116 is capable of caching (i.e., storing) data, at least temporarily, prior to more permanently storing the data in the storage devices 80. Such data, when stored in the cache 116, is commonly referred to as cached data 126. In contrast, the storage devices 80 are capable of storing data in a nonvolatile manner. The data stored in the storage devices 80 is referred to as un-cached data 128 even though that data may also reside in the cache 116. Further details of the invention will now be provided with reference to FIG. 4.

Figure 4:
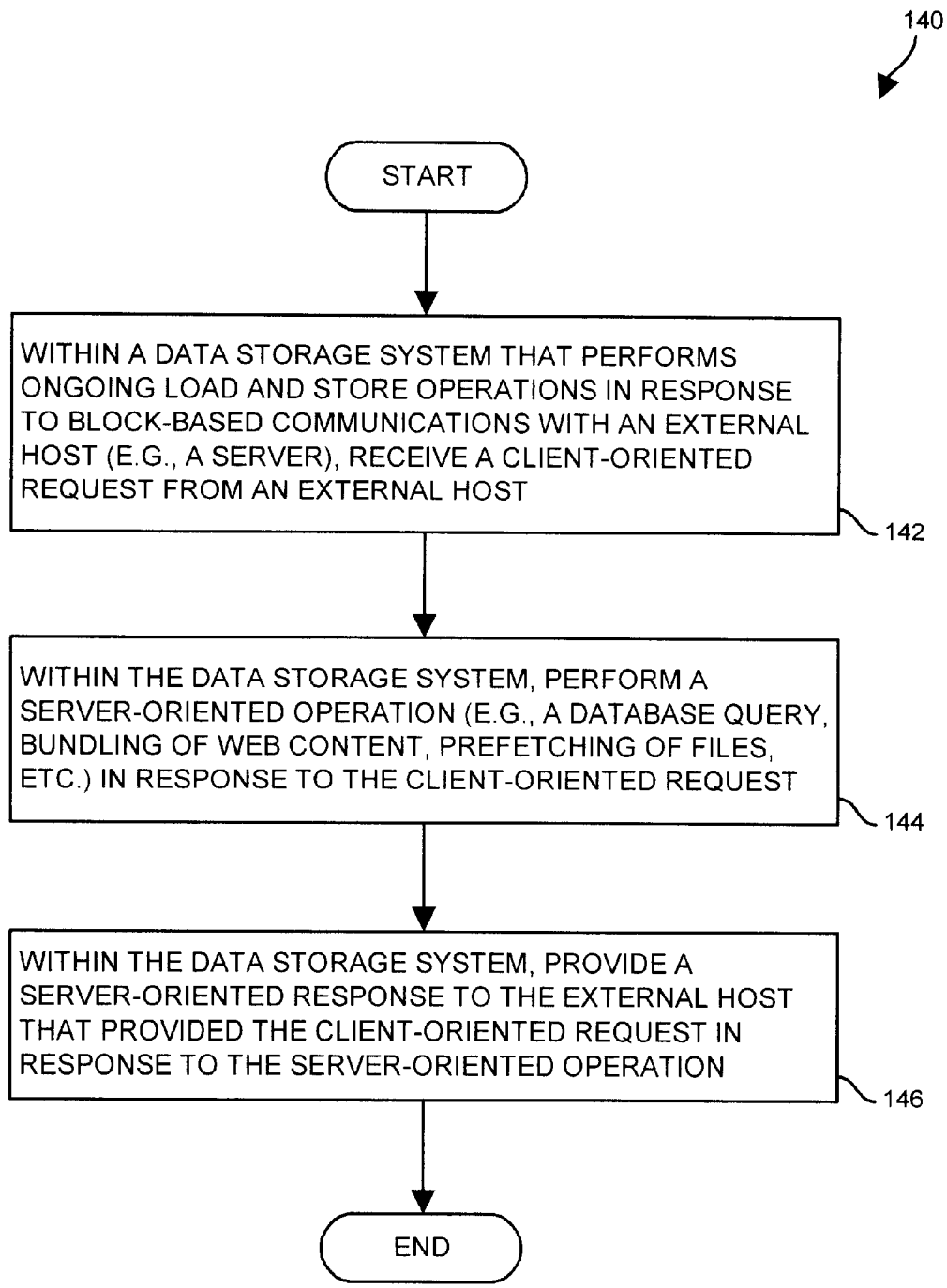
FIG. 4 is a flowchart of a procedure performed by the data storage system of FIG. 3.

FIG. 4 shows a procedure 140 which is performed by the set of interface circuits 120 of the data storage system 66. In step 142, while the set of interface circuits 120 performs ongoing load and store operations in response to block-based communications with external hosts (e.g., servers), the set of interface circuits 120 receives a client-oriented request 82 (e.g., a Gigabit Ethernet signal defining a client request) from an external host (e.g., the client system 62).

In step 144, the set of interface circuits 120 performs a server-oriented operation in response to the client-oriented request. Examples of such an operation include querying a database (a database server operation), retrieving web content in response to a web address (a web server operation), caching of web content referenced in the retrieved web content (a "smart" pre-fetch operation), retrieving a file in response to a file name and a directory name (a file server operation), and caching a file within the same directory (or related directories) as the retrieved file (another "smart" pre-fetch operation).

In step 146, the set of interface circuits 120 provides, in response to the server-oriented operation, a server-oriented response 84 (e.g. a Gigabit Ethernet signal containing a result of the server-oriented operation) to the external host that provided the client-oriented request 82. Accordingly, the data storage system 66 is capable operating as more than just a simple data storage system which handles only block-based communications. That is, the data storage system 66 is capable of providing non-block-based services (e.g., operating as a database server, web server, file server, etc.). Further details of the data storage network 60 will now be provided with a more-detailed example which references FIGS. 2–7.

Figure 5:
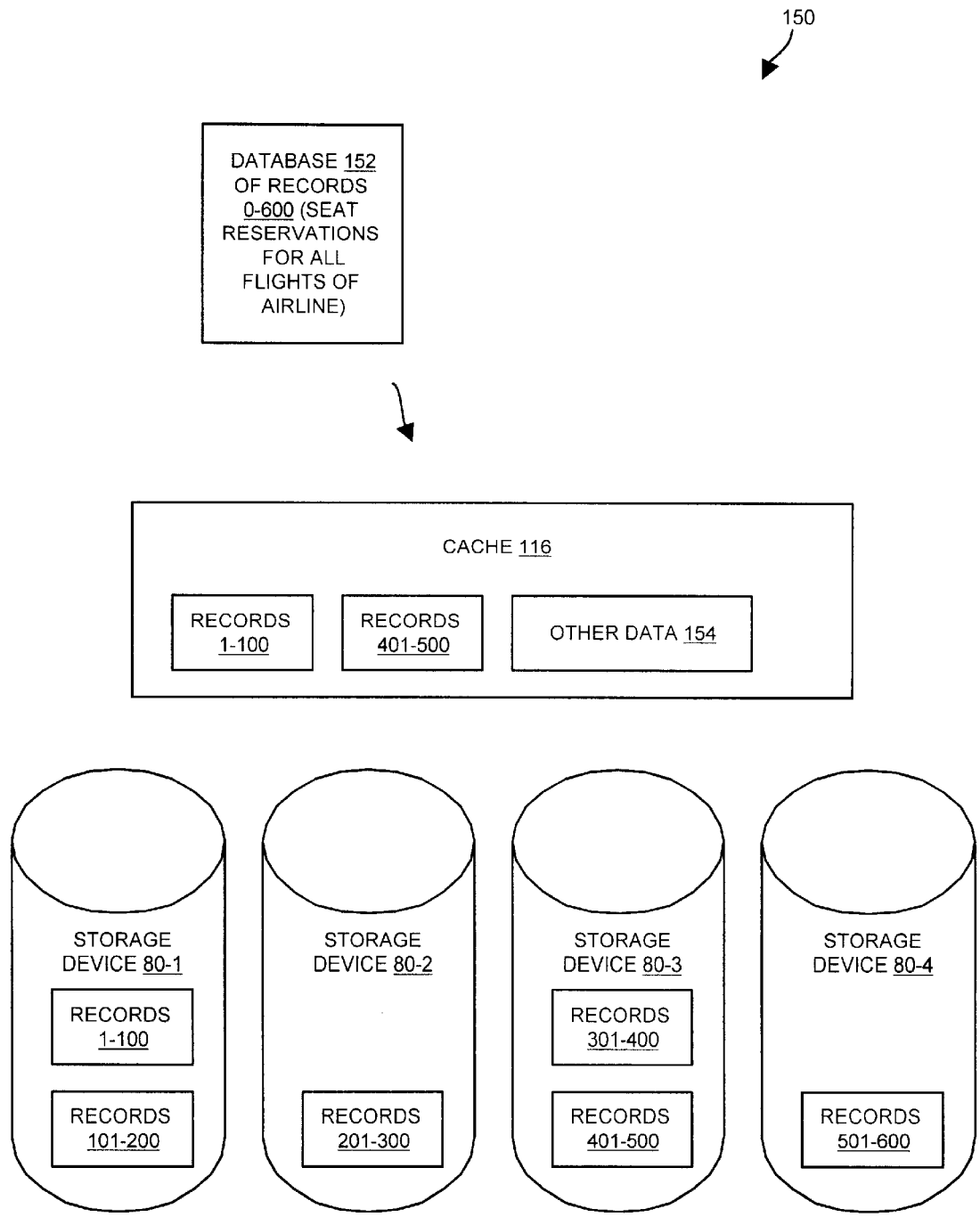
FIG. 5 is a block diagram of a database of records stored within the data storage system of FIG. 3.

The data storage system 66 of the data storage network 60 (see FIG. 2) is capable of operating as a database server. For example, suppose that the data storage network 60 operates as a flight reservation system for an airline. To this end, suppose that the storage devices 80 of the data storage system 66 store a database 152 containing seat reservations for all of its flights, as shown in FIG. 5. By way of example only, the data storage system 66 includes four storage devices 80-1, 80-2, 80-3, and 80-4, and the database 152 includes records 1–600 which are distributed among the cache 116 and the storage devices 80. In particular, as shown in FIG. 5, records 1–100 reside in the cache 116 and on the storage device. 80-1, records 101–200 reside on the storage device 80-1, records 201–300 reside on the storage device 80-2, records 301–400 reside on the storage device 80-3, records 401–500 reside in the cache 116 and on the storage device 80-3, and records 501–600 reside on the storage device 80-4. As shown and as just mentioned, versions of the records 1–100 and 401–500 reside in both the cache 116 (cached versions) and on the storage devices 80 (un-cached versions).

It should be understood that the cache 116 and the storage devices 80 can store other data as well. By way of example, the cache 116 includes data 154 that is not a record of the database 152 (e.g., hash tables, control information, cache slot headers, reservation bits, data that is unrelated to the database 152, etc.).

Further suppose that each of the front-end interface circuits 114 includes a server process 122, and that each of the back-end interface circuits 118 includes a server process 124 (see FIG. 3). Furthermore, suppose that each server process 122, 124 is capable of performing a database operation (a server-oriented operation) on the database 152 (a server-oriented operation) on behalf of an external host (e.g., the client system 62). In one arrangement, the server process 122 on each front-end interface circuit 114 is capable of performing a database query on cached portions of the database 152, and the server process 124 on each back-end interface circuit 118 is capable of performing a database query on un-cached portions of the database 152 in the storage devices 80. In another arrangement, the server processes 122 on each front-end interface circuit 114 simply pass-on database query operations to the server processes 124 on the back-end interface circuits 118 and, in turn, the server processes 124 on the back-end interface circuits 118 perform database queries on both cached and un-cached portions of the database 152.

For purposes of this example, suppose that the server processes 122 are capable of performing database queries on the cached portions of the database 152, and that the server processes 124 are capable of performing database queries on the un-cached portions of the database 152. In particular, suppose that an associate exists between each server process 124 and particular records of the database 152. In this example, suppose that the server process 124-1 of the back-end interface circuit 118-1 is associated with records 1–300, and the server process 124-N of the back-end interface circuit 118-N is associated with records 301–600.

A user can operate the client system 62 (an external host) to (i) identify empty seats on a particular flight of the airline, and (ii) purchase tickets to reserve such seats. For example, suppose that a user wishes to reserve an empty seat on particular flight. The user enters a request for empty seats on the particular flight using the user interface 69 of the application front-end 68 running on the client system 62 (also see FIG. 2). In response, the client services module 70 running on the client system 62 sends a client-oriented request 82 (e.g., defined in a Gigabit Ethernet signal) to the data storage system 66. The client-oriented request 82 requests all empty seats on the particular flight. One of network adapters 112 receives the client-oriented request 82 through a port 110, and enables the set of interface circuits 120 (i.e., the front-end interface circuits 114 and the back-end interface circuits 118) to understand and process the client-oriented request 82.

Figure 6:
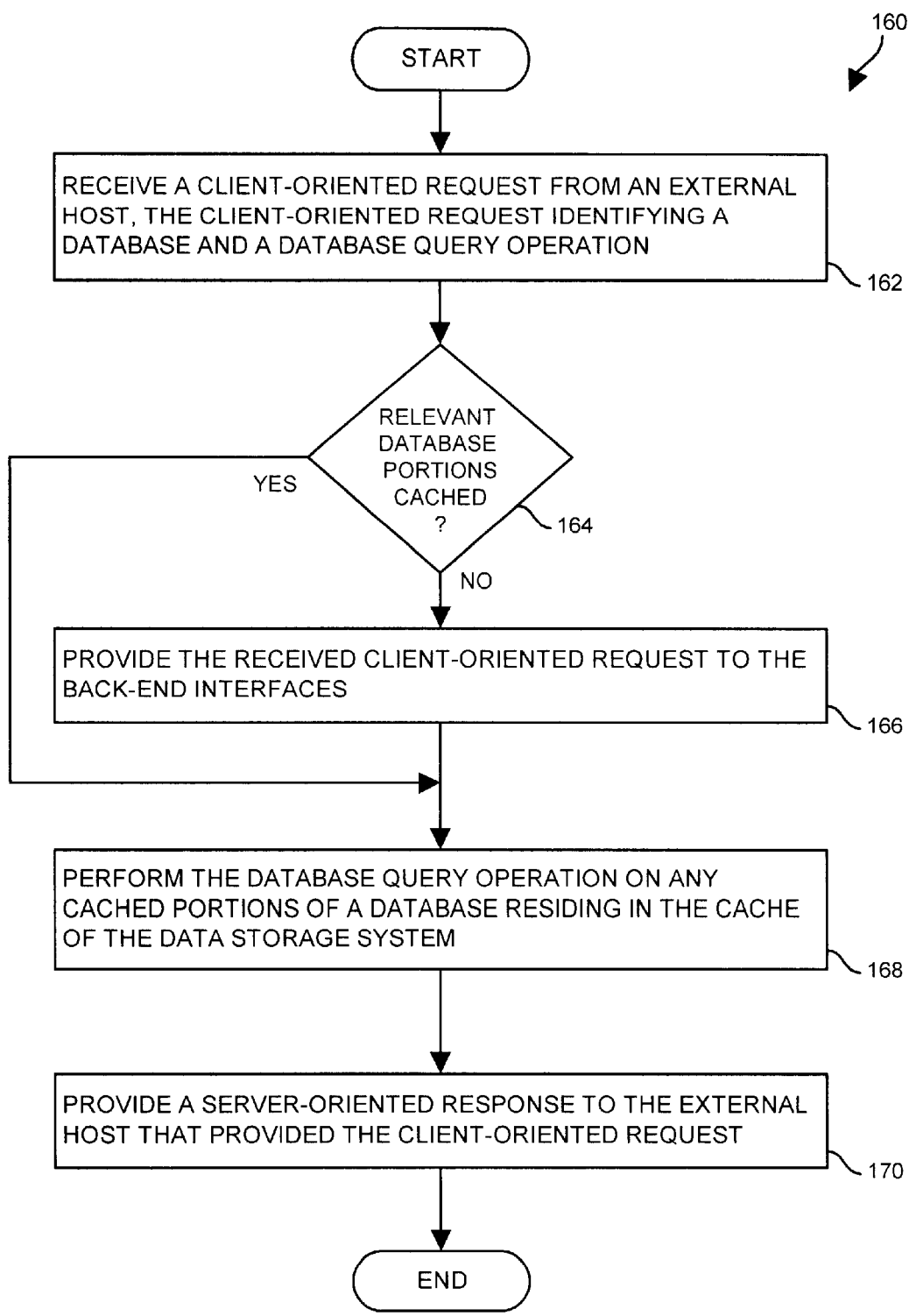
FIG. 6 a flowchart of a procedure performed by front-end interface circuits of the data storage system of FIG. 3 when the data storage system of FIG. 3 operates as a database server.

FIG. 6 shows a procedure 160 which is performed by the server processes 122 of the front-end interface circuits 114. In step 162, the server processes 122 receives the client-oriented request 82 from the client system 62. The client-oriented request 82 identifies the database 152 and a database query operation.

In step 164, the server processes 122 examines database query operation identified by the client-oriented request 82 and determines whether the relevant portion or portions of the database 152 are cached. The server process 122 can make such a determination by examining one or more standard database hash tables, or using other standard database methods. Suppose that not all of the relevant portions of the database 152 are in the cache 116, e.g., as shown in FIG. 5, only records 1–100 and 401–500 reside in the cache 116. Accordingly, step 164 proceeds to step 166. If the relevant portions of the database 152 had completely resided within in the cache 116, step 164 would have skipped step 166 and proceeded directly to step 168.

In step 166, the server processes 122 provide the received client-oriented request 82 to the back-end interface circuits 118. In one arrangement, the client-oriented request 82 is sent through the cache 116. In another arrangement, the client-oriented request 82 is sent through circuitry of the data storage system 66 that circumvents the cache 116.

In step 168, the server processes 122 perform the database query operation on any relevant cached portions of the database 152 residing in the cache 116. In the example, the server process 122-1 of the front-end interface circuit 114-1 performs the database query on the records 1–100 and the records 401–500.

In step 170, the server processes 122 provide a server-oriented response 84 to the client system 62, i.e., the external host that provided the client-oriented request 82. In particular, the server processes 122 provide any empty seats for the particular flight that were found in the database records 1–600 stored in the cache 116 resulting from the database queries (server-oriented operations). In particular, the server processes 122 include any empty seats for the particular flight that were found by the server process 122-1 in database records 1–100 and 401–500, and any empty seats for the particular flight that were found and reported by the server processes 124 in the remaining database records (i.e., records 101–400 and 501–600). The application front-end 68 of the client system 62 receives the server-oriented response 84 (e.g., defined by a Gigabit Ethernet signal through the network 106) and renders the empty seats of the particular flight for use by the user (e.g., so that the user can subsequently reserve a seat on the particular flight).

Figure 7:
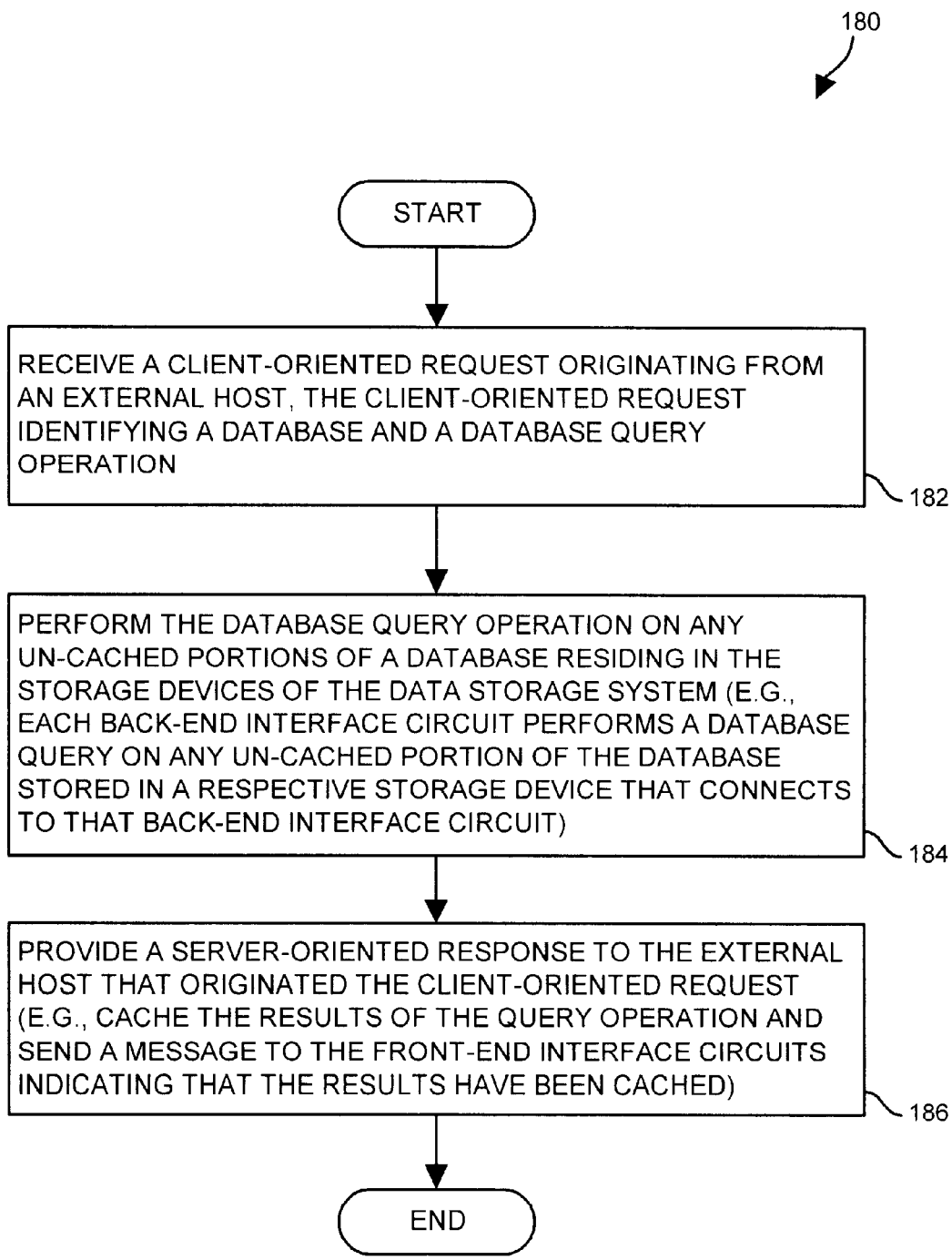
FIG. 7 is a flowchart of a procedure performed by back-end interface circuits of the data storage system of FIG. 3 when the data storage system of FIG. 3 operates as a database server.

FIG. 7 shows a procedure 180 which is performed by the server processes 124 of the back-end interface circuits 118 In step 182, the server processes 124 receive the client-oriented request 82 originating from the client system 62 as a result of step 166 of the procedure 160 (see FIG. 6). As mentioned above, the client-oriented request 82 identifies the database 152 and a database query operation.

In step 184, the server processes 124 performs the database query operation on any un-cached portions of the database 152 residing in the storage devices 80 of the data storage system 66. In the example, since the server process 124-1 is associated with records 101–200 and 201–300, the server process 124-1 performs the database query operation on the records 101–200 which are stored in the storage device 80-1, and the records 201–300 which are stored in the storage device 80-2. Similarly, since the server process 124-N is associated with records 301–400 and 501–600, the server process 124-N performs the database query operation on the records 301–400 which are stored in the storage device 80-3, and the records 501–600 which are stored in the storage device 80-4.

In step 186, the server processes 124 cache the empty seats for the particular flight that were found in the queried records on the storage devices 80, and direct the server processes 122 running on the front-end interface circuits 114 to provide this data in the form of a server-oriented response 84 to the external host that originated the client-oriented request 82, i.e., the client system 62. In particular, the server processes 124 provide a response that identifies the empty seats of the particular flight that were found in the records 101–200, 201–300, 301–400, and 501–600 of the database 152, and send messages to the server processes 122 on the front-end interface circuits 114 (e.g., through the cache, through a connection that circumvents the cache 116, etc.) indicating that the back-end query operations are complete. Preferably, the front-end interface circuits 114, or alternatively the network adaptors 112, combine the server-oriented responses 84 from the front-end interface circuits 114 and the back-end interface circuits 118 into a single server-oriented response 84 which is sent back to the client system 62.

Figure 1:
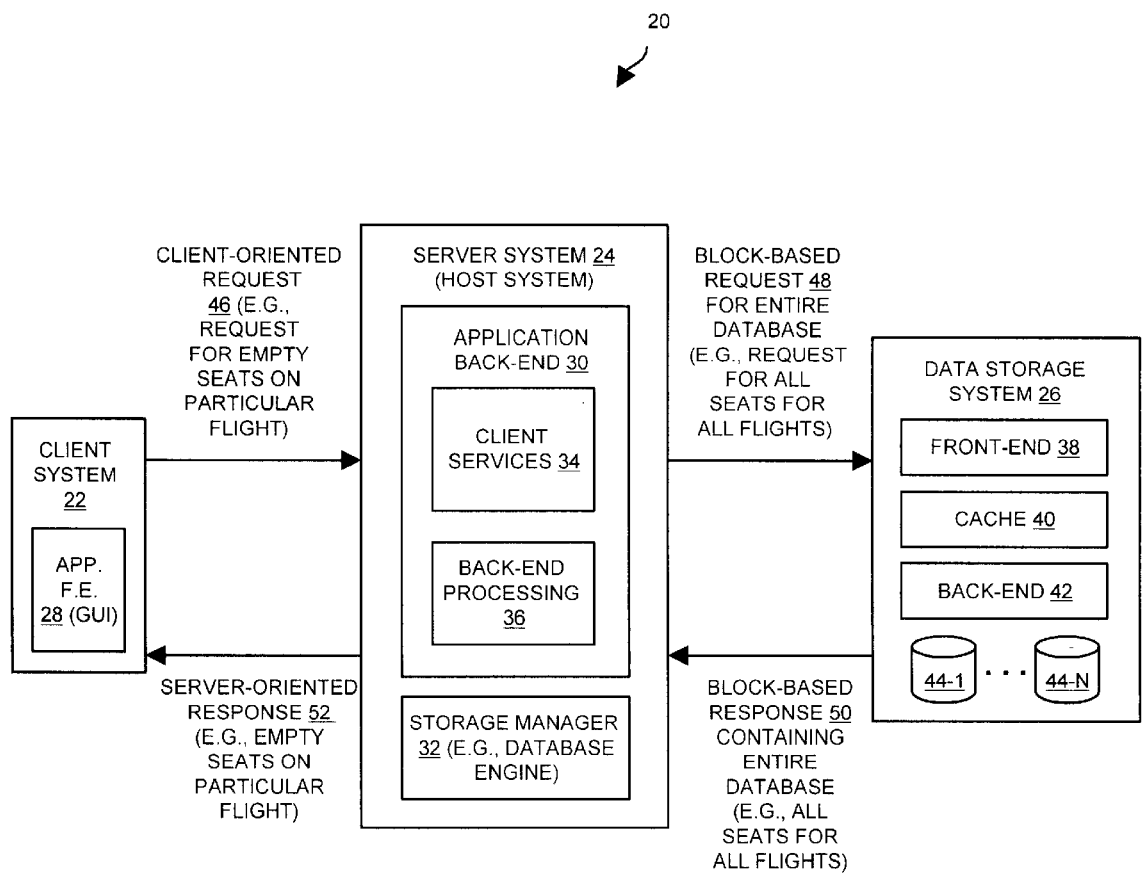
FIG. 1 is a block diagram of a conventional configuration between a client system, a server system and a data storage system.

As described above, the data storage system 66 is capable of operating as a database server. As such, the server-oriented response 84 is the only information that needs to be sent from the data storage system 66 to the client system 62. The entire database 152 does not need to be sent from the data storage system 66 as is required by conventional configurations (see FIG. 1). Furthermore, there is no multiple server intercommunication generated since the database query is performed within the data storage system 66 and not by multiple servers needing to coordinate database access. Accordingly, consumed bandwidth between the data storage system 66 and external hosts is minimized.

It should be further understood that the server processes 122, 124 reduce the amount of data transferred through the cache 116 of the data storage system 66 (i.e., the load between the front-end and back-end of the data storage system 66). In particular, the entire database 152 does not pass through the cache 116. Rather, the front-end interface circuits 114 perform database query operations on cached records existing within the cache 116, and the back-end interface circuits 118 perform database query operations on un-cached records residing in the storage devices 80. The back-end interface circuits 118 then cache only relevant items (e.g., the results of the query operations). Accordingly, traffic through the cache 116 is reduced thus alleviating any cache contention issues. Further details of the data storage network 60 will now be provided with reference to an example which references FIGS. 8–10.

Figure 8:
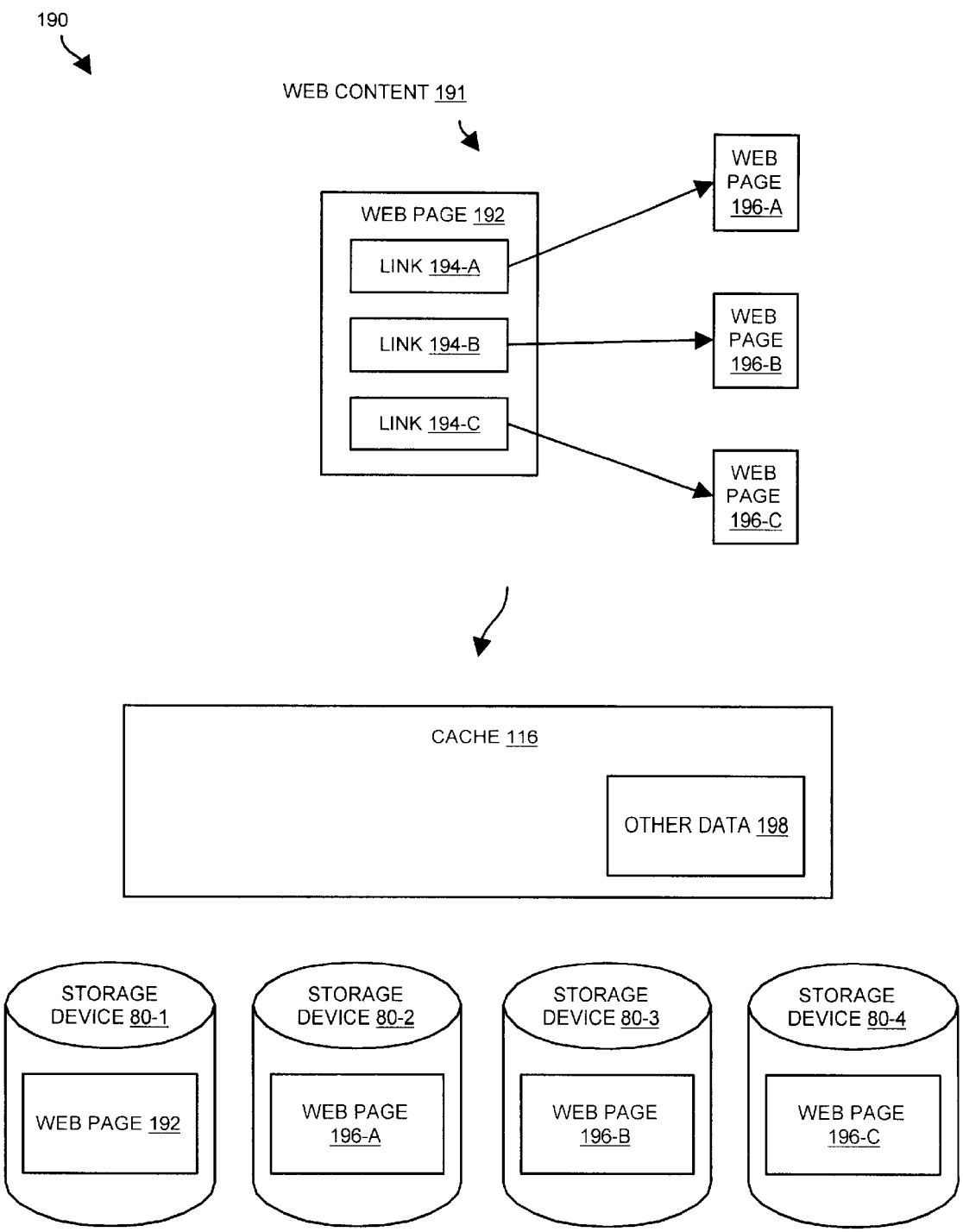
FIG. 8 is a block diagram of content stored within the data storage system of FIG. 3.

The data storage system 66 of the data storage network 60 is capable of operating as a web server. To this end, suppose that the storage devices 80 of the data storage system 66 store web content 191 such as a web page 192 that includes a set of links 194-A, 194-B and 194-C. Further suppose that each of these links 194 respectively identifies web pages 196-A, 196-B and 196-C (i.e., more web content) as shown in FIG. 8. By way of example only, the data storage system 66 includes four storage devices 80-1, 80-2, 80-3, and 80-4, and the web content 191 is distributed among the data storage devices 80. In particular, as shown in FIG. 8, the web page 192 is stored in the storage device 80-1, the web page 196-A is stored in the storage device 80-2, the web page 196-B is stored in storage device 80-3, and the web page 196-C is stored in the storage device 80-4. It should be understood that cached copies of any of the web pages 192, 196 can reside within the cache 116. Furthermore, it should be understood that the cache 116 can store other data 198 that is unrelated to the web pages 192, 196.

Further suppose that each of the front-end circuits 114 includes a server process 122, and that each of the back-end interface circuits 118 includes a server process 124 (see FIG. 3). Furthermore, suppose that each server process 122, 124 is capable of performing a web server operation (a server-oriented operation) on behalf of an external host (e.g., the client system 62). In particular, the server process 122 of each front-end interface circuit 114 is capable of serving cached portions of web content, and the server process 124 on each back-end interface circuit 118 is capable of serving un-cached portions of web content. In the example, suppose that the server process 124-1 of the back-end interface circuit 118-1 is associated with the web pages 192 and 196-A, and the server process 124-N of the back-end interface circuit 118-N is associated with the web pages 196-B and 196-C.

A user can operate the client system 62 to (i) retrieve all or some of the web content 191. For example, suppose that the user wishes to retrieve the web page 192. The user enters a request for the web page 192 using the user interface 69 (e.g., a web browser) of the application front-end 68 running on the client system 62 (also see FIG. 2). In response, the client services modules 70 running on the client system 62 sends a client-oriented request 82 to the data storage system 66. The client-oriented request 82 includes a web address identifying the web page 192, e.g., a Universal Resource Locator (URL). The set of network adapters 112 then receive the client-oriented request 82 through the set of ports 110, and enable the set of interface circuits 120 to understand and process the client-oriented request 82. A communication to a particular socket number (e.g., socket number 80) can be used to identify a particular type of client request (e.g., a request for web content vis-a-vis a file request), and the network adaptors 112 can direct the client request 82 based on the type of client request.

Figure 9:
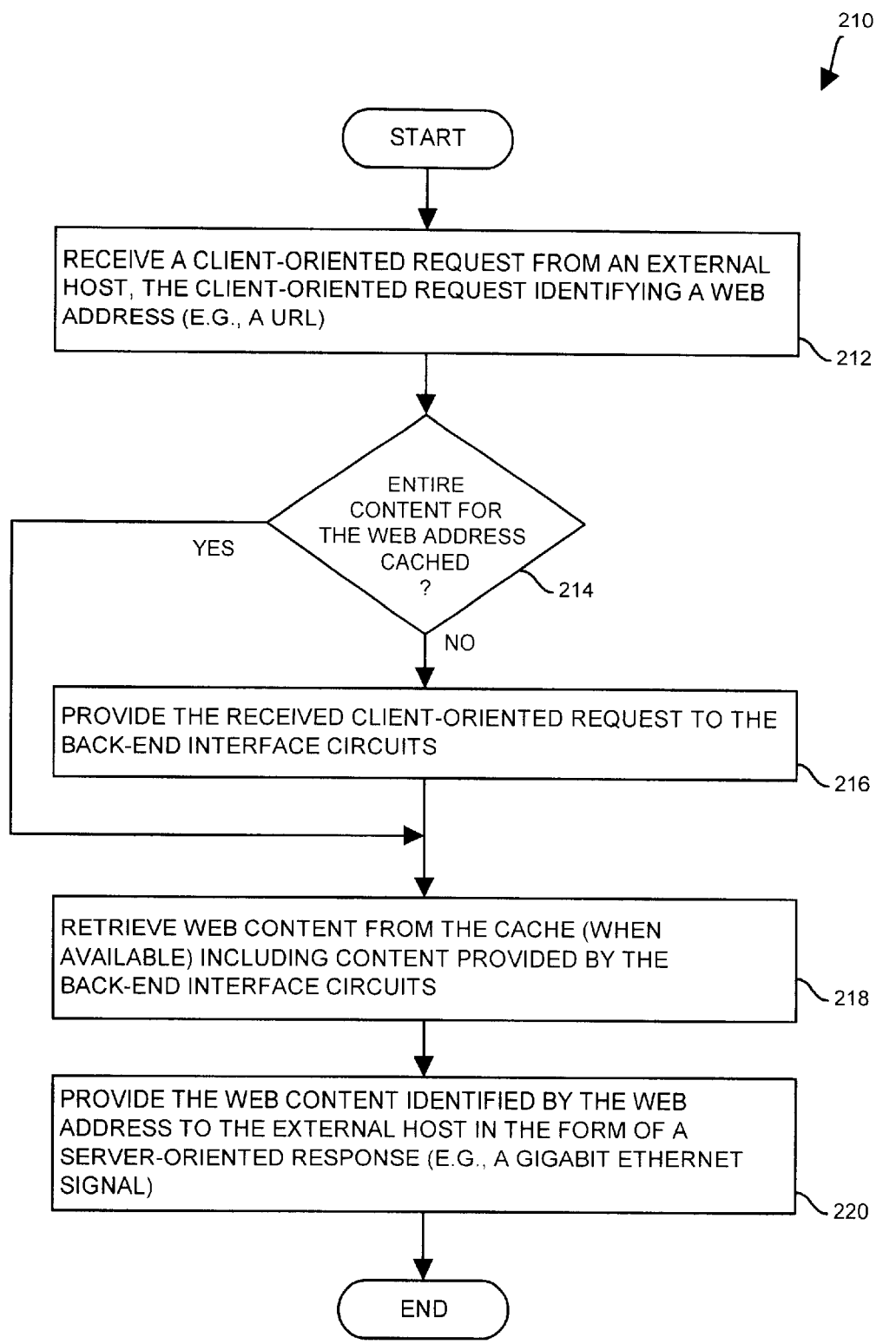
FIG. 9 is a flowchart of a procedure performed by front-end interface circuits of the data storage system of FIG. 3 when the data storage system of FIG. 3 operates as a web server.

FIG. 9 shows a procedure 210 which is performed by the server processes 122 of the front-end interface circuits 114. In step 212, the server processes 122 receive the client-oriented request 82 from the client system 62. The client-oriented request 82 includes a web address (e.g., a URL) that identifies the web page 192 stored on the storage device 80-1.

In step 214, the server processes 122 determine whether all of the web content identified by the web address is cached. In some situations, some or all portions of the identified web content may already reside in the cache (e.g., when the identified web content was retrieved in response to an earlier request). In the example, and as shown in FIG. 8, none of the web page 192 is cached. Accordingly, step 214 proceeds to step 216. If the entire web page 192 had resided within the cache 116, step 214 would have skipped step 216 and proceeded directly to step 218.

In step 216, the server processes 122 provides the received client-oriented request 82 to the back-end interface circuits 118. In one arrangement, the client-oriented request 82 is sent through the cache 116 to the back-end interface circuits 118. In another arrangement, the client-oriented request 82 passes through other circuitry of the data storage system 66 that circumvents the cache 116.

In step 218, the server processes 122 retrieve the identified web content from the cache 116. As mentioned above, some or all of the portions of the identified web may already be available in the cache 116. In other situations, the server processes 122 task switch to perform other operations while server processes 124 on the back-end interfaces 118 load the un-cached portions of the web content into the cache 116 from the storage devices 80. In the example, there initially is no identified web content residing in the cache 116. Accordingly, the server processes 112 task switch until the web content (i.e., the web page 192) is loaded from the storage devices 80. In one arrangement, the server processes 124 on the back-end interfaces 118 inform the server processes 122 on the front-end interfaces 114 that the web content is now in the cache 116 by passing a message to the processes 122.

In step 220, the server processes 122 provide the retrieved web content to the external host in the form of the server-oriented response 84 (e.g., defined by a Gigabit Ethernet signal). In the example, since the server process 122-1 is associated with the web page 192, that server process 122-1 retrieves the web page 192 from the cache 116 and provides that web page 192 to the client system 62 in the form of the server-oriented response 84.

Figure 10:
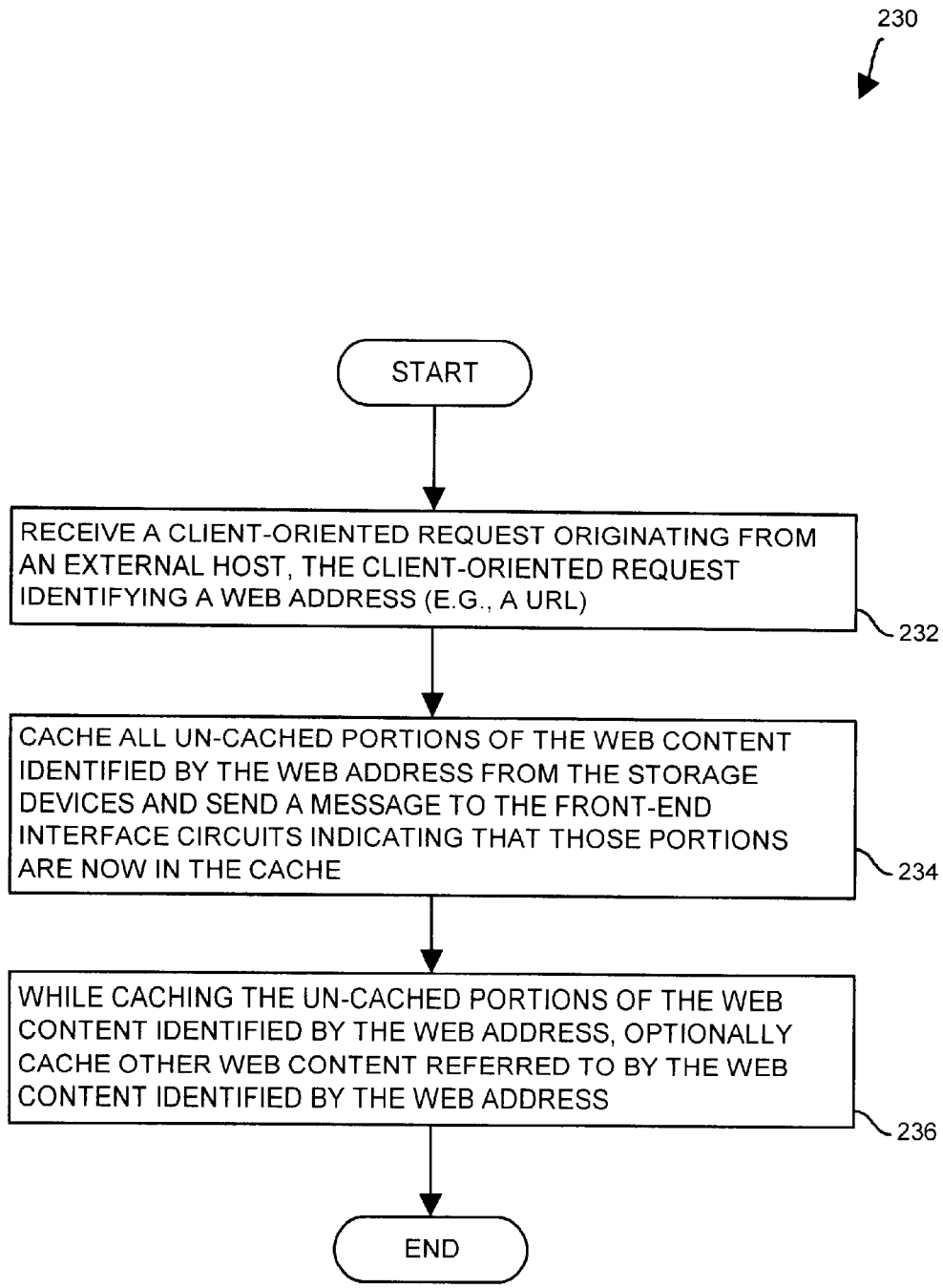
FIG. 10 is a flowchart of a procedure performed by back-end interface circuits of the data storage system of FIG. 3 when the data storage system of FIG. 3 operates as a web server.

FIG. 10 shows a procedure 230 which is performed by the server processes 124 of the back-end interface circuits 118. In step 232, the server processes 124 receive the client-oriented request 82 originating from the client system 62 as a result of step 216 of the procedure 210 (see FIG. 9). As mentioned above, the client-oriented request 82 includes a web address identifying the web page 192 (see FIG. 8).

In step 234, the server processes 124 cache un-cached portions of the requested web content. In the example, since the server process 124-1 is associated with the web page 192, the server process 124-1 loads the web page 192 from the storage device 80-1 into the cache 116. The server processes 124 then send messages to the server processes 122 on the front-end interface circuit 114 indicating that the web content has been cached. The server processes 122 (i.e., the server process 122-1) then transfer the web page 192 from the cache 116 to the client system 62 in the form of the server-oriented response 84 (see steps 218, 220 of FIG. 9).

In step 236, the server processes 124 optionally cache other web content referred to by the requested web content, i.e., the web page 192. That is, during step 234, the server processes 124 analyzed the web page 192 (e.g., while loading the web page 192 into the cache 116) to determine other web content referenced by the requested web content. In particular, back in step 234, while the server processes 124 loaded the web page 192 into the cache 116, the server processes 124 determined that the web page 192 includes links 194-8, 194-B, and 194-C. Accordingly, in step 236, the server processes 124 load the web pages 196-A, 196-B, and 196-C which are respectively identified by the links 194-8, 194-B, and 194-C, into the cache 116. In particular, due to their earlier-described associations, the server process 124-1 loads the web page 196-A into the cache 116, and the server process 124-N loads the web pages 196-B and 196-C into the cache 116. Accordingly, the server processes 124 effectively pre-fetch web content having a high likelihood of being requested in the near future. As such, if the user later requests this pre-fetched web content, there will be less data retrieval latency than if the web content had not been pre-fetched since that web content is already available in the cache 116.

It should be understood that the above-described pre-fetching feature is optional. In particular, this "smart" pre-fetch feature can be selectively enabled and disabled based on operating conditions of the data storage system 66. For example, in situations of high cache traffic (e.g., when contention for the cache 116 is high), the pre-fetching feature can be dynamically disabled (e.g., disabled automatically by the server processes 122, 124) so that the server processes 124 will not pre-fetch web content into the cache 116. As another example, some types of content can be selectively pre-fetched while other types of content are not pre-fetched (e.g., images, JAVA routines, frames, etc.).

Additionally, it should be understood that the web content was described above as web pages by way of example only. The web pages can be incomplete web pages that reference "server-side include" data, i.e., data provided from other sources that is included in the final web page rendered at the client (e.g., stock prices, headline news, etc.). Also, the pre-fetched web content can be "client-side include" data, i.e., data that the client needs to further request such as images, Javascripts, content referenced by links in the web page, Audio media, Video media, scripts that run on the server (e.g., PERL scripts, CGI scripts, etc), and the like. It is the pre-fetching of these different types of web content, namely, the "client-side include" data, that can be automatically enabled and disabled by the server processes 122, 124 based on current traffic conditions within the data storage system 66.

Furthermore, it should be understood that the server-oriented response 84 provided by the data storage system 66 relieves any server system, e.g., the server system 64 of FIGS. 2 and 3, of the burden of servicing the client-oriented request 82. Rather, the data storage system 66 handles the client-oriented request 82 directly. Accordingly, the server system 64 has more capacity to perform other operations, e.g., additional back-end processing operations.

Figure 11:
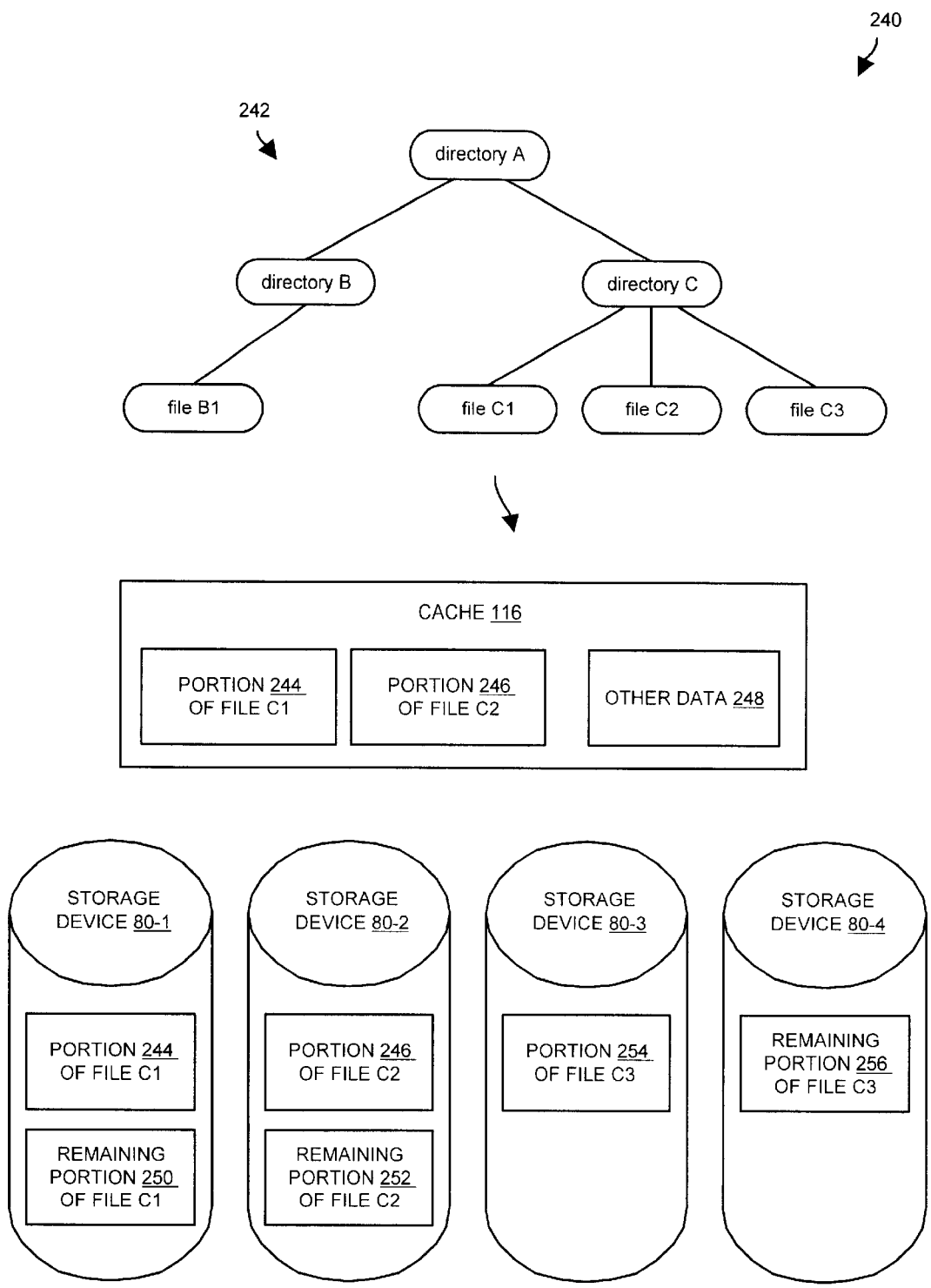
FIG. 11 is a block diagram of a file system stored within the data storage system of FIG. 3.

The data storage system 66 of the data storage network 60 is capable of operating as a file server. To this end, suppose that the data storage devices 80 of the data storage system 66 store a file system 242, as shown in FIG. 11. Here, the file system 242 takes the form of an inverted hierarchical tree structure by way of example only (e.g., a UNIX file system). In particular, directory A includes directory B and directory C. Directory B includes a file B1. Similarly, the directory C includes a file C1, a file C2 and a file C3.

Also by way of example only, the data storage system 66 includes four storage devices 80-1, 80-2, 80-3, and 80-4, and portions of the file system 242 are distributed among the data storage devices 80. In particular, as shown in FIG. 11, the cache 116 stores a portion 244 of the file C1 and a portion 246 of the file C2. Additionally, the storage device 80-1 stores a remaining portion 250 of the file C1, the storage device 80-2 stores a remaining portion 252 of the file C2, the storage device 80-3 stores a portion 254 of the file C3, and the storage device 80-4 stores a remaining portion 256 of the file C3. It should be understood that the other portions of the file system 242 (e.g., directories A, B and C which are themselves files) are stored in other locations within the cache 116 and storage devices 80. It should be further understood that the cache 116 is capable of caching other data 248 that is unrelated to the file system 242.

Further suppose that each of the front-end circuits 114 includes a server process 122 and that each of the back-end interface circuits 118 includes a server process 124 (see FIG. 3). Furthermore, suppose that each server process 122, 124 is capable of performing a file system operation (a server-oriented operation) on behalf of an external host. In one arrangement, the server process 124 on each back-end interface circuit 118 is associated with portions of the file system 242. In the example, suppose that the server process 124-1 of the back-end interface circuit 118-1 is associated with the portion 244 of file C1 in the cache 116 and in the storage device 80-1, the remaining portion 250 of file C1 in the storage device 80-1, and the portions 246 and 252 of file C2 in the storage device 80-2. Similarly, suppose that the server process 124-N of the back-end interface circuit 118-N is associated with the portion 254 of file C3 in the storage device 80-3 and the remaining portion 256 of file C3 in the storage device 80-4.

The user can operate the client system 62 to (i) retrieve all or some of the file system 242. For example, suppose of the user wishes to retrieve the file C1. The user enters a request for the file C1, a network file system (NFS) request, using the user interface 69 of the application front-end 68 running on the client system 62 (also see FIG. 2). In response, the client services module 70 running on the client system 62 (e.g., an NFS client) sends a client-oriented request 82 to the data storage system 66. The client-oriented request 82 (e.g., an NFS request) includes a file name and a directory name. The set of network adapters 112 then receive the client-oriented request 82 through the set of ports 110, to enable the set of interface circuits 120 to understand and process the client-oriented request 82.

Figure 12:
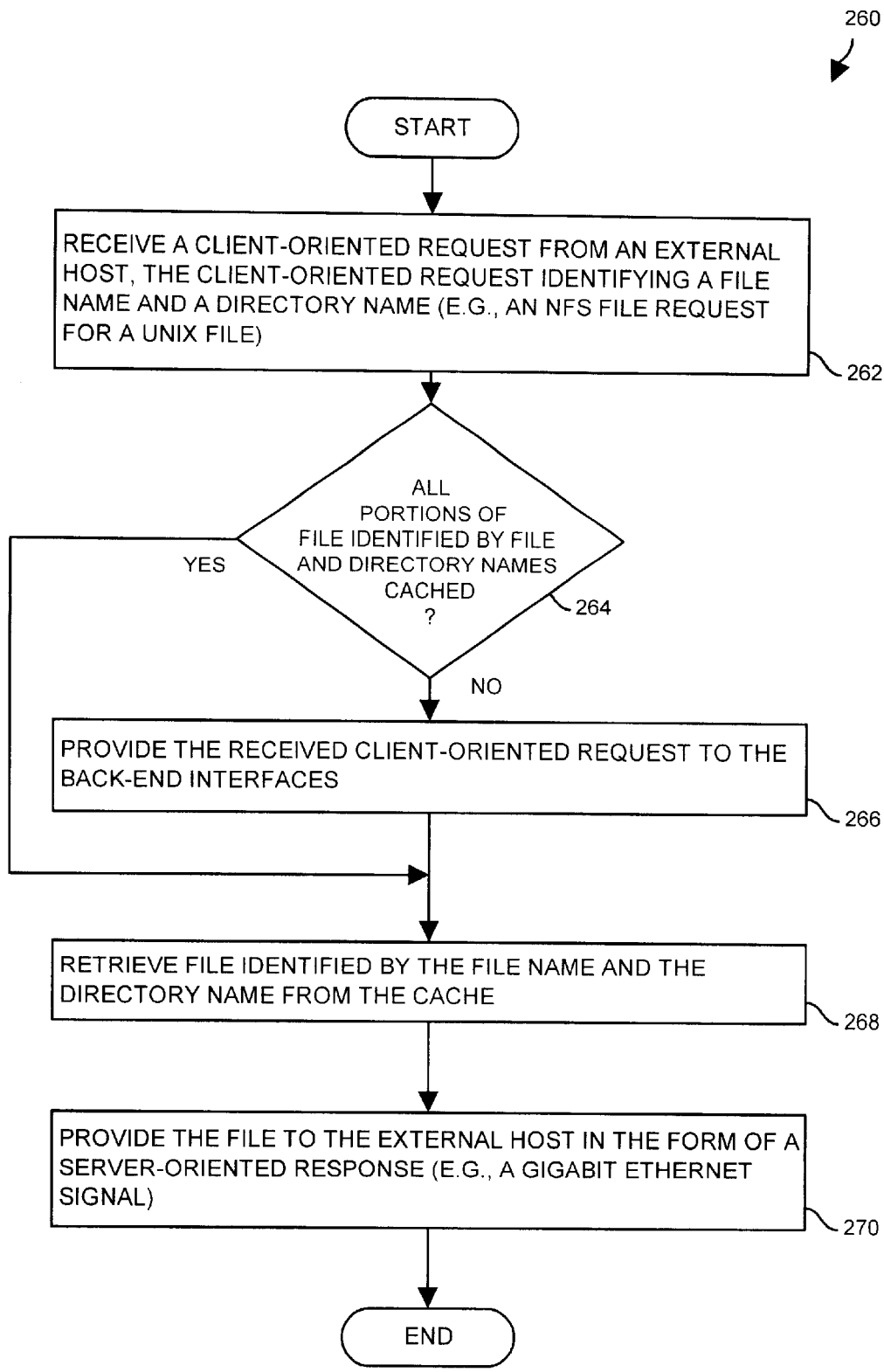
FIG. 12 is a procedure performed by front-end interface circuits of the data storage system of FIG. 3 when the data storage system of FIG. 3 operates as a network file server.

FIG. 12 shows a procedure 260 which is performed by the server processes 122 of the front-end interface circuits 114. In step 262, the server processes 122 receive the client-oriented request 82 from the client system 62. The client-oriented request 82 identifies a file, namely the file C1, by a file name and a directory name.

In step 264, the server processes 122 determine whether the relevant portions of the file identified by the file name and the directory name reside in the cache 116. If so, step 264 proceeds to step 268. If not, step 264 proceeds to step 266. In the example, only a portion 244 of the file C1, which is identified by the file name and the directory name of the client-oriented request 82, resides in the cache 116. Accordingly, step 264 proceeds step 266.

In step 266, the server processes 122 provide the client-oriented request 82 to the back-end interface circuits 118. In one arrangement, the client-oriented request 82 is sent through the cache 116 to the back-end interface circuit 118. In another arrangement, the client-oriented request 82 passes through other circuitry of the data storage system 66 that circumvents the cache 116.

In step 268, the server processes 122 retrieve the identified file. In the example, since server process 122-1 is associated with the file C1, the server process 122-1 retrieves the file C1 from the cache 116. Some or all the portions of the file C1 may already be available in the cache 116. In other situations, the server processes 122 task switches to enable the back-end interface circuits 118 to load un-cached portions of the identified file into the cache 116 from the storage devices 80. In the example, the portion 244 of file C1 initially resides in the cache 116. Accordingly, the server process 122-1 can immediately retrieve that portion 244 of the file C1. However, the portion 250 of file C1 is un-cached and initially resides only in the storage device 80-1. As such, the server process 122-1 can task switch until that portion 250 is loaded from the storage device 80-1.

In step 270, the server processes 122 provide the retrieve file to the external host in the form of a server-oriented response 84 (e.g., defined by a Gigabit Ethernet signal). In the example, since the server process 122-1 retrieves the file C1 from the cache 116 and provides that file C1 to the client system 62 in form of the server-oriented response 84.

Figure 13:
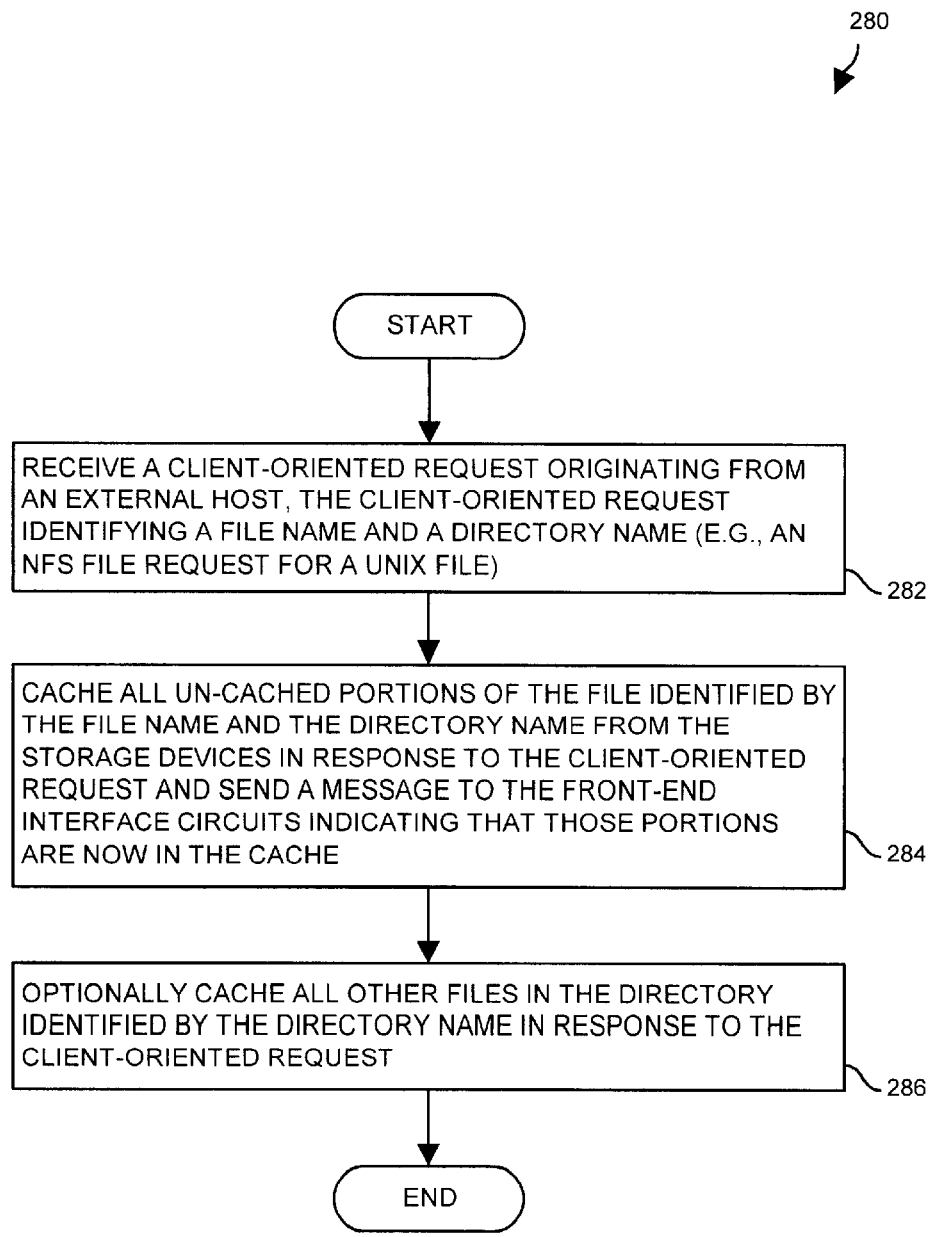
FIG. 13 is a procedure performed by back-end interface circuits of the data storage system of FIG. 3 when the data storage system of FIG. 3 operates as a network file server.

FIG. 13 shows a procedure 280 which is performed by the server processes 124 of the back-end interface circuits 118. In step 282, the server processes 124 receive a client-oriented request 82 originating from the client system 62 as a result of step 266 of the procedure 260 (see FIG. 12). As described above, the client-oriented request 82 identifies the file C1 (see FIG. 11).

In step 284, the server processes 124 cache un-cached portions of the file identified by the file name and the directory name from the storage devices 80 in response to the client-oriented request 82. In the example, since the server process 124-1 is associated with the file C1, the server process 124-1 loads the remaining portion 250 of the file C1 from the storage device 80-1 into the cache 116. At this point, the server processes 124 can send one or more messages to the server processes 122 on the front-end interface circuits 114 indicating that the requested file has been cached. The server processes 122 (i.e., the server process 122-1) then transfer the loaded portions from the cache 116 to the client system 62 and forms the server-oriented response 84 (see steps 268, 270 of FIG. 12).

In step 286, the server processes 124 optionally cache all other files in the directory that contained the requested file identified by the file name and the directory name. In the example, and during step 284, while the server processes 124 loaded the remaining portions of the file C 1, the server processes 124 examined the files within the directory that contained the requested file (the file C1), namely directory C. That is, back in step 284, the server processes 124 determined that the files C2 and C3 also resided in directory C. Accordingly, in step 286, the server processes 124 load any un-cached portions of the files C2 and C3 into the cache 116. In particular, since the server process 124-1 is associated with the file C2, that server process 124-1 pre-fetches the remaining portion 252 of file C2 from the storage device 80-2. Similarly, since server process 124-N is associated with the file C3, that server process 124-N pre-fetches the portions 254, 256 of file C3 from the storage devices 80-3, 80-4. As a result, the server processes 124 have effectively pre-fetched other files having a high likelihood of being requested in the near future. As such, if the user later requests these pre-fetched files, there will be less data retrieval latency (since the files are already in the cache 116) than if the files had not been pre-fetched.

It should be understood that the above-described "smart" pre-fetch feature is optional. That is, this feature can be selectively enabled and disabled based on operating conditions of the data storage system. For example, in situations of cache congestion, e.g. when traffic through the cache 116 is high, the "smart" pre-fetch feature can be disabled (e.g., automatically during high traffic conditions within the data storage system 66) so that the server processes 124 will not pre-fetch any files into the cache 116. Alternatively, the server processes 124 can wait for more than one file to be requested from a particular directory (e.g., two files), or similarly named files from different directories before pre-fetching additional files.

It should be further understood that the server-oriented response 84 provided by the data storage system 66 relieves any server system, e.g., the server system 64 of FIGS. 2 and 3, of the burden of servicing the client-oriented request 82. Rather, the data storage system 66 directly handles the client-oriented request 82. Accordingly, the server system 64 has more capacity to perform other operations, e.g., additional back-end processing operations.

As described above, the invention is directed to techniques for handling a client-oriented request 82 (e.g., a Gigabit Ethernet signal containing a client request) within a data storage system 66. Handling of the client-oriented request 82 enables direct communication between a client and the data storage system 66 thus offloading the burden of handling the client request 82 from any server system. Additionally, in some situations, such handling of the client-oriented request 82 within the data storage system 66 enables reduced traffic through the cache 116 of the data storage system, and reduced traffic between the data storage system 66 and external devices, e.g., client systems and server systems which communicate with the data storage system 66. ). For example, multiple server intercommunication can be avoided since server operations can be performed within the data storage system 66 rather than by multiple servers needing to coordinate access to data. The features of the invention, as described above, may be employed in computer systems and methods such as those manufactured by EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the above-provided examples included a server processes 122, 124 in each of the interface circuits 120 (i.e., each of the front-end interface circuits 114 and each of the back-end interface circuits 118) by way of example only. Other arrangements are suitable for use by the invention as well. For example, in some arrangements, only the front-end interface circuits 114 include server processes 122. It may be convenient to implement the invention into some conventional data storage system designs by incorporating server processes 122 in the front-end interface circuits 114 and delaying implementation of the server processes 124 into the back-end interface circuits 118 due to urgencies in bringing an improved product to market. A configuration having server processes 124 in the back-end interface circuits 118 could then be introduced in a later release.

Figure 14:
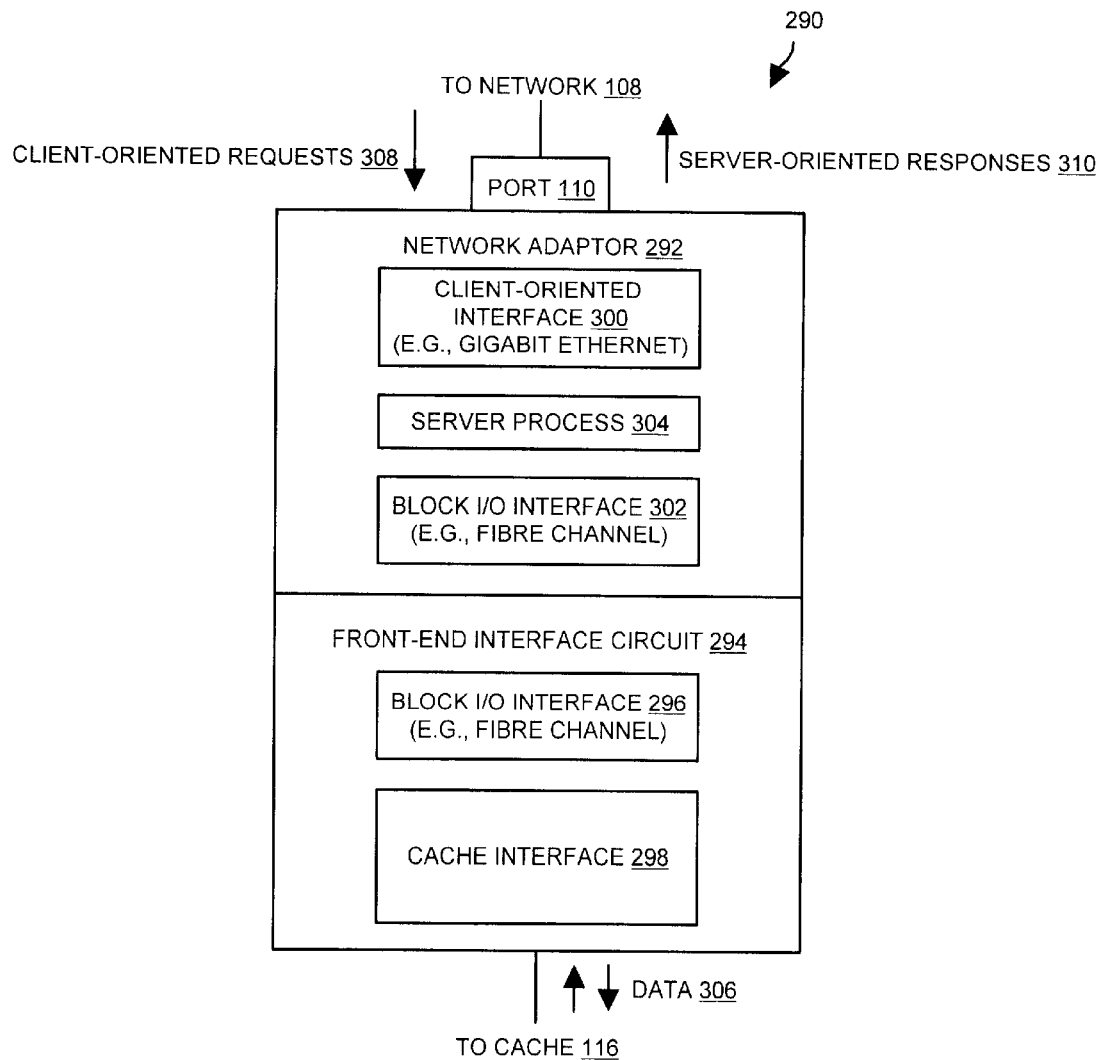
FIG. 14 is a block diagram of an alternative arrangement for a network adaptor and a front-end interface of the data storage system of FIG. 3.

FIG. 14 shows an alternate configuration 290 for a front-end interface circuit and a network adaptor to that shown in FIG. 3. As shown in FIG. 14, a server process resides in a network adapter 292 rather than in a front-end interface circuit 294. In the configuration 290, a front-end interface circuit 294 having a block I/O interface 296 (e.g., a Fibre Channel interface) and a cache interface to 298 may already be available (e.g., used in a conventional data storage system design). In such a situation, it may be more convenient to develop the network adapter 292 which includes a client-oriented interface 300 and a block I/O interface 302 (e.g., a Fibre Channel interface) that corresponds with the block I/O interface 296 of the front-end interface 294. In such a situation, it may be more convenient to implement the server processes 304 within the newly developed network adapters 292. That is, within the server processes 304 in the network adaptors 292, the server processes 304 perform various server-oriented operations, e.g., the procedure 180 of FIG. 6, the procedure 210 of FIG. 9, and the procedure 260 of FIG. 12 in response to a client-oriented request 308. The server processes 304 still provide a server-oriented response is 310 in response to the client-oriented requests 308 as described above for the arrangements in which the server processes 122, 124 resided within the set of interface circuits 120.

Regardless of whether the server processes 122, 124 reside in the network adaptors or interface circuits, different types of client requests (e.g., requests for a disk sector vis-a-vis requests for database records) can be arranged to reference real memory (i.e., real I/O) or virtual memory (i.e., virtual I/O). For example, real memory can have an address range from 0 to 1 terabyte, and virtual memory can have an address range above 1 terabyte. The server processes 122, 124 can handle requests to real memory in one manner (e.g., treat the data as block I/O or raw data), and handle requests to virtual memory in a different manner (e.g., treat the data as records).

Furthermore, it should be understood that the server processes 122, 124 can be processes that run separately on top of an operating system (e.g., a UNIX core). Alternatively, the server process can be the operating system itself with integrated server-oriented routines (e.g., database handling routines, etc.).

Additionally, it should be understood that the block-based communications were described above as SCSI and Fibre Channel communications by way of example only. Other types of block-based communications are suitable as well including ESCON, SSA, etc.

Furthermore, it should be understood that the client-oriented communications were described above as Gigabit Ethernet communications by way of example only. Other types of client-oriented communications are suitable as well including standard Ethernet, Fast Ethernet, FDDI, ATM, and the like.

Additionally, it should be understood that each of the set of interface circuits 120 was described above as being associated with a particular memory construct (e.g., database records, web content, file, etc.). Other associations are suitable as well including associating each interface circuit 120 with a section or partition of the cache 116 (e.g., a memory address range) and one or more storage devices (e.g., one or more disk drives). In such arrangements, each server process 122, 124 is responsible for retrieving data from the memory address range of the cache 116 and/or disk drives associated with its interface circuit 120. For example, the server process 124-1 can be responsible for a particular address range of the cache 116 and for storage device 80-1 (see FIG. 3).

Furthermore, it should be understood that the storage devices 80 were described above as being disk drives by way of example only. Other types of storage devices are suitable as well including tape drives, CDROM, semiconductor memory, etc.

What is claimed is:

1. A data storage system, comprising:
    a set of ports for connecting to an external host;
    a cache for buffering data exchanged between the external host and a set of storage devices; and
    a set of interface circuits including (i) multiple front-end interface circuits interconnected between the cache and the set of ports, and (ii) multiple back-end interface circuits interconnected between the cache and the set of storage devices, wherein the set of interface circuits is configured to receive a client-oriented request from the external host and perform a server-oriented operation in response to the client-oriented request.

2. The data storage system of claim 1 wherein the client-oriented request identifies a database and a database query operation, and wherein the multiple front-end interface circuits are configured to:
    perform the database query operation on cached portions of the database residing in the cache in response to the client-oriented request.

3. The data storage system of claim 2 wherein the multiple back-end interface circuits are configured to:
    perform the database query operation on un-cached portions of the database residing in the set of storage devices in response to the client-oriented request.

4. The data storage system of claim 3 wherein the un-cached portions of the database are stored in the set of storage devices in a distributed manner, and wherein each of the multiple back-end interface circuits is configured to:
    perform, in response to the client-oriented request, the database query operation on a respective un-cached portion of the database stored in a storage device to which that back-end interface circuit connects.

5. The data storage system of claim 1 wherein the client-oriented request identifies a web address, and wherein the multiple front-end interface circuits are configured to:

provide, from the cache, cached portions of web content corresponding to the web address identified by the client-oriented request in response to the client-oriented request.

6. The data storage system of claim 5 wherein the multiple back-end interface circuits are configured to:

retrieve, from the set of storage devices, un-cached portions of web content corresponding to the web address identified by the client-oriented request in response to the client-oriented request.

7. The data storage system of claim 6 wherein the un-cached portions of web content identify an additional web address, and wherein the multiple back-end interface circuits are further configured to:

detect the additional web address in the web content while the multiple back-end interface circuits retrieve the un-cache portions from the set of storage devices; and cache, from the set of storage devices, web content corresponding to the additional web address in response to detection of the additional web address.

8. The data storage system of claim 1 wherein the client-oriented request identifies a file name and a directory name, and wherein the multiple front-end interface circuits are configured to:

provide, from the cache, cached portions of a file corresponding to the file name and the directory name identified by the client-oriented request in response to the client-oriented request.

9. The data storage system of claim 8 wherein the multiple back-end interface circuits are configured to:

provide, from the set of storage devices, un-cached portions of the file corresponding to the file name and the directory name identified by the client-oriented request in response to the client-oriented request.

10. The data storage system of claim 9 wherein the set of storage devices store, in a single directory corresponding to the directory name identified by the client-oriented request, both (i) the file corresponding to the file name and the directory name identified by the client-oriented request and (ii) another file, and wherein the multiple back-end interface circuits are further configured to:

detect existence of the other file while the multiple back-end interface circuits retrieve the un-cache portions from the set of storage devices; and cache, from the set of storage devices, the other file in response to detection of the existence of the other file.

11. The data storage system of claim 1, further comprising:

a set of network adaptors for sending client-oriented communications to the external host and receiving client-oriented communications from the external host, the set of network adaptors being interconnected between the multiple front-end interface circuits and the set of ports.

12. The data storage system of claim 1 wherein the first front-end interface circuit includes a first front-end processor which is configured to move data from the first external host into the cache through the first physical port; wherein the second front-end interface circuit includes a second front-end processor which is configured to move data from the second external host into the cache through the second physical port; wherein the first back-end interface circuit includes a first back-end processor which is configured to move data from the cache into the first storage device; and wherein the second back-end interface circuit includes a second back-end processor which is configured to move data from the cache into the second storage device.

13. The data storage system of claim 12 wherein the first and second front-end processors are configured to perform data storage system operations to access data within the data storage system in response to non-block-based instructions from the first and second external hosts.

14. The data storage system of claim 13 wherein the first and second back-end processors are configured to perform data storage system operations to access data within the data storage system in response to non-block-based instructions from the first and second external hosts.

15. In a data storage system having (i) a set of ports for connecting to external hosts, (ii) a cache for buffering data exchanged between the external hosts and a set of storage devices, and (iii) a set of interface circuits that includes multiple front-end interface circuits interconnected between the cache and the set of ports, and multiple back-end interface circuits interconnected between the cache and the set of storage devices, a method comprising the steps of:

in response to block-based load and store requests from the external hosts, providing data from the storage devices to the external hosts, and storing data from the external hosts in the storage devices;

receiving a client-oriented request from at least one external host; and performing a server-oriented operation in response to the received client-oriented request.

16. The method of claim 15 wherein the client-oriented request identifies a database and a database query operation, and wherein the step of performing the server-oriented operation includes the step of:

performing the database query operation on cached portions of the database residing in the cache in response to the client-oriented request.

17. The method of claim 16 wherein the step of performing the server-oriented operation further includes the step of:

performing the database query operation on un-cached portions of the database residing in the set of storage devices in response to the client-oriented request.

18. The method of claim 17 wherein the un-cached portions of the database are stored in the set of storage devices in a distributed manner, and wherein the step of performing the database query operation on the un-cached portions of the database includes, for each storage device storing an un-cached portion of the database, the step of:

performing an individual database query on that un-cached portion of the database in response to the client-oriented request.

19. The method of claim 15 wherein the client-oriented request identifies a web address, and wherein the step of performing the server-oriented operation includes the step of:

providing, from the cache, cached portions of web content corresponding to the web address identified by the client-oriented request in response to the client-oriented request.

20. The method of claim 19 wherein the step of performing the server-oriented operation further includes the step of:

providing, from the set of storage devices, un-cached portions of web content corresponding to the web address identified by the client-oriented request in response to the client-oriented request.

21. The method of claim 20 wherein the un-cached portions of web content identify an additional web address, and wherein the step of performing the server-oriented operation further includes the step of:

detecting the additional web address in the web content while un-cache portions are retrieved from the set of storage devices; and caching, from the set of storage devices, web content corresponding to the additional web address in response to detection of the additional web address.

22. The method of claim 15 wherein the client-oriented request identifies a file name and a directory name, and wherein the step of performing the server-oriented operation includes the step of:

providing, from the cache, cached portions of a file corresponding to the file name and the directory name identified by the client-oriented request in response to the client-oriented request.

23. The method of claim 22 wherein the step of performing the server-oriented operation further includes the step of:

providing, from the set of storage devices, un-cached portions of the file corresponding to the file name and the directory name identified by the client-oriented request in response to the client-oriented request.

24. The method of claim 23 wherein the set of storage devices store, in a single directory corresponding to the directory name identified by the client-oriented request, both (i) the file corresponding to the file name and the directory name identified by the client-oriented request and (ii) another file, and wherein the step of performing the server-oriented operation further includes the step of:

detecting existence of the other file while the un-cache portions are retrieved from the set of storage devices; and caching, from the set of storage devices, the other file in response to detection of the existence of the other file.

25. The method of claim 14 wherein the first front-end interface circuit includes a first front-end processor which is configured to move data from the first external host into the cache through the first physical port; wherein the second front-end interface circuit includes a second front-end processor which is configured to move data from the second external host into the cache through the second physical port; wherein the first back-end interface circuit includes a first back-end processor which is configured to move data from the cache into the first storage device; wherein the second back-end interface circuit includes a second back-end processor which is configured to move data from the cache into the second storage device; and wherein the step of concurrently moving includes the step of:

operating the front-end processors and the back-end processors simultaneously to provide non-block-based data storage operations to access data within the data storage system.

* * * * *

UNITED STATES PATENT AND TRADEMARK OFFICE
CERTIFICATE OF CORRECTION

PATENT NO.   : 6,732,117 B1
DATED        : May 4, 2004
INVENTOR(S)  : Kendall A. Chilton It is certified that error appears in the above-identified patent and that said Letters Patent is hereby corrected as shown below:

Column 20,
Line 44, "request." should read -- request, and wherein the set of ports includes a first physical port and a second physical port; wherein the multiple front-end interface circuits include a first front-end interface circuit which connects a first external host to the cache through the first physical port, and a second front-end interface circuit which connects a second external host to the cache, through the second physical port independently of the first front-end interface circuit; and wherein the multiple back-end interface circuits include a first back-end interface circuit which connects the cache to a first storage device independently of the front-end interface circuits, and a second back-end interface circuit which connects the cache to a second storage device independently of the front-end interface circuits.--

Column 22,
Line 26, "request." should read -- request, wherein the set of ports includes a first physical port and a second physical port; wherein the multiple front-end interface circuits include a first front-end interface circuit which connects a first external host to the cache through the first physical port, and a second front-end interface circuit which connects a second external host to the cache through the second physical port independently of the first front-end interface circuit; wherein the multiple back-end interface circuits include a first back-end interface circuit which connects the cache to a first storage device independently of the front-end interface circuits, and a second back-end interface circuit which connects the cache to a second storage device independently of the front-end interface circuits, and
wherein the method further comprises the step of:
concurrently moving (i) first data through from the first external host to the cache through the first physical port and the first front-end interface circuit, (ii) second data through from the second external host to the cache through the second physical port and the second front-end interface circuit, (iii) third data from the cache to the first storage device through the first back-end interface circuit, and (iv) fourth data from the cache to the second storage device through the second back-end interface circuit.--

Column 24,
Line 6, "claim 14 wherein" should read -- claim 15 wherein --

Signed and Sealed this

Nineteenth Day of October, 2004

JON W. DUDAS
*Director of the United States Patent and Trademark Office*